United States Patent [19]
Rose

[11] Patent Number: 5,696,664
[45] Date of Patent: Dec. 9, 1997

[54] BASEPAN WITH INTEGRALLY FORMED POSTS FOR MOUNTING COMPONENTS BY HEAT STAKING

[75] Inventor: William E. Rose, Grayson, Ga.

[73] Assignee: Siemens Energy & Automation, Inc., Alhparetta, Ga.

[21] Appl. No.: 622,973

[22] Filed: Mar. 27, 1996

[51] Int. Cl.⁶ ........................................ H02B 1/20
[52] U.S. Cl. .................. 361/639; 174/166 R; 264/249; 439/573
[58] Field of Search .................. 29/243.5; 264/249, 264/548; 425/112, 518; 174/68.2, 70 B, 71 B, 72 B, 99 B, 199 B, 164, 166 R, 166 S; 361/627, 634, 637, 639, 644, 648, 650, 807, 809; 439/460, 571–573, 574

[56] References Cited

U.S. PATENT DOCUMENTS

| | | | |
|---|---|---|---|
| 3,367,809 | 2/1968 | Soloff | 156/73 |
| 3,627,906 | 12/1971 | Kurz | 174/143 |
| 3,688,159 | 8/1972 | Robbins | 317/100 |
| 4,118,754 | 10/1978 | Duggan | 361/355 |
| 4,251,851 | 2/1981 | Diersing et al. | 361/363 |
| 4,253,226 | 3/1981 | Taleda | 29/432 |
| 4,301,493 | 11/1981 | Schweikle et al. | 361/355 |
| 4,312,077 | 1/1982 | Petersson | 2/265 |
| 4,399,420 | 8/1983 | Palmer | 335/21 |
| 4,449,296 | 5/1984 | Luke et al. | 29/883 |
| 4,536,823 | 8/1985 | Ingram et al. | 361/355 |
| 4,633,559 | 1/1987 | Loren | 29/243 |
| 4,646,198 | 2/1987 | Rich et al. | 361/346 |
| 4,740,865 | 4/1988 | Barner | 361/346 |
| 4,767,298 | 8/1988 | Bocchiccihio et al. | 425/112 |
| 4,822,671 | 4/1989 | Carper et al. | 428/33 |
| 4,931,898 | 6/1990 | Cole | 361/361 |
| 4,931,902 | 6/1990 | Cole | 361/354 |
| 4,966,512 | 10/1990 | Takaku | 411/181 |
| 5,072,071 | 12/1991 | Cassity et al. | 174/65 |
| 5,081,560 | 1/1992 | Donnerstag | 361/358 |
| 5,134,543 | 7/1992 | Sharp et al. | 361/358 |
| 5,272,591 | 12/1993 | Blue et al. | 361/622 |
| 5,272,592 | 12/1993 | Harris et al. | 361/637 |
| 5,340,945 | 8/1994 | Gehrs | 174/174 |
| 5,341,273 | 8/1994 | Sharp et al. | 361/641 |
| 5,420,749 | 5/1995 | Gehrs | 361/634 |
| 5,450,282 | 9/1995 | Webber et al. | 361/637 |

*Primary Examiner*—Gerald P. Tolin
*Attorney, Agent, or Firm*—Ira Lee Zebrak

[57] ABSTRACT

A basepan for an electric load center having a surface with integrally formed posts with an undercut extending around its periphery for securing a component of the load center to the surface by heat staking.

9 Claims, 19 Drawing Sheets

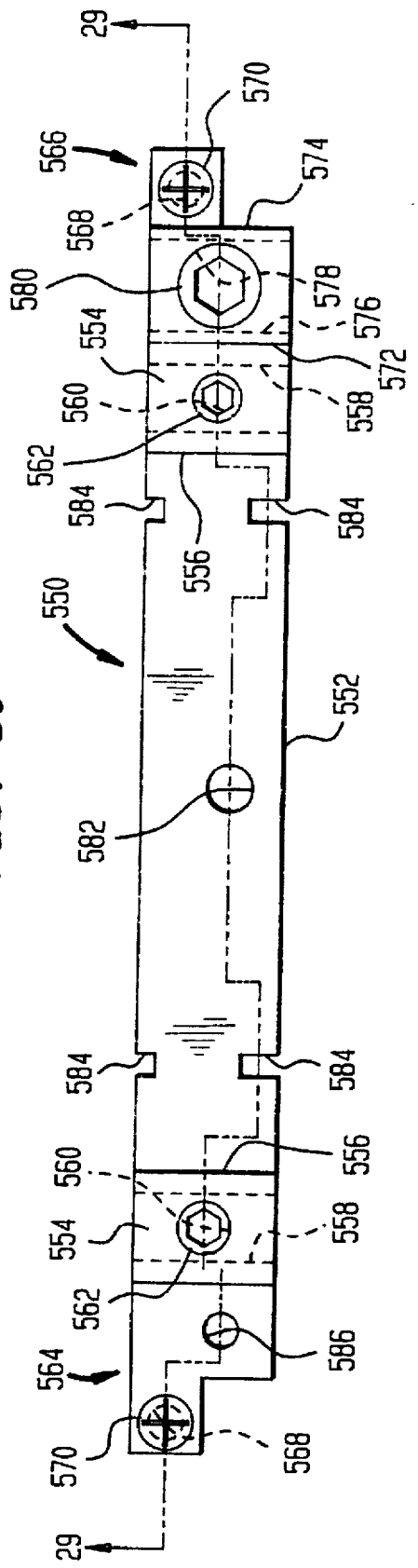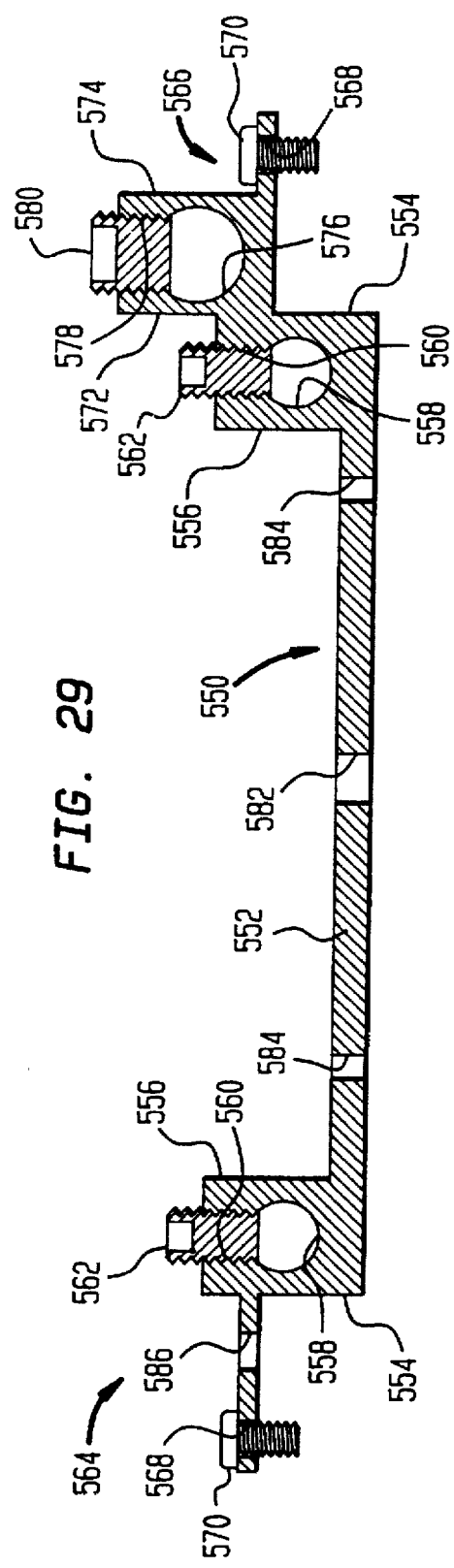

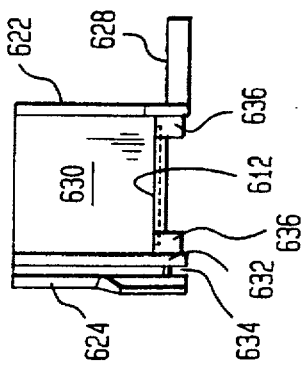
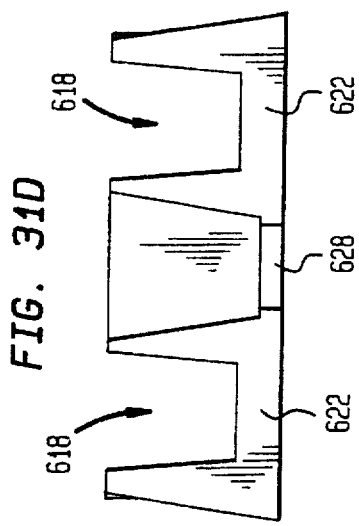
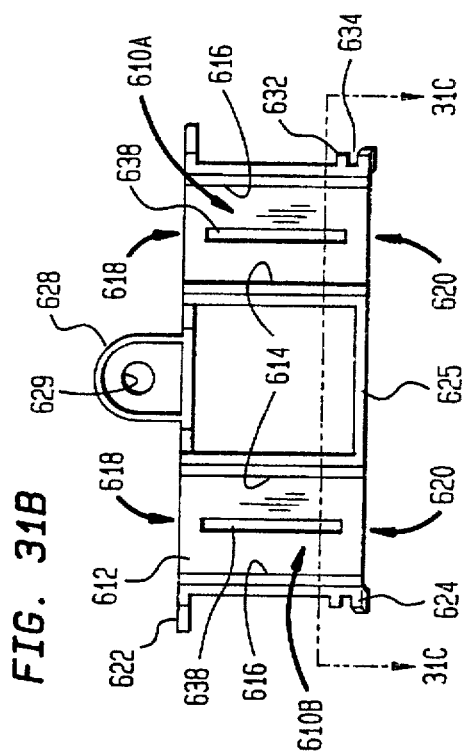
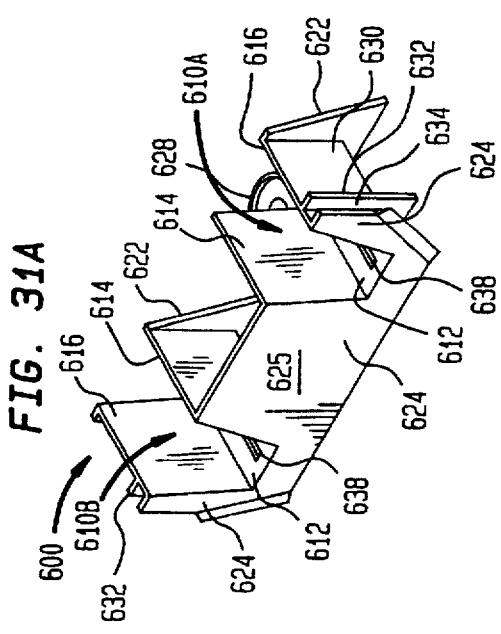
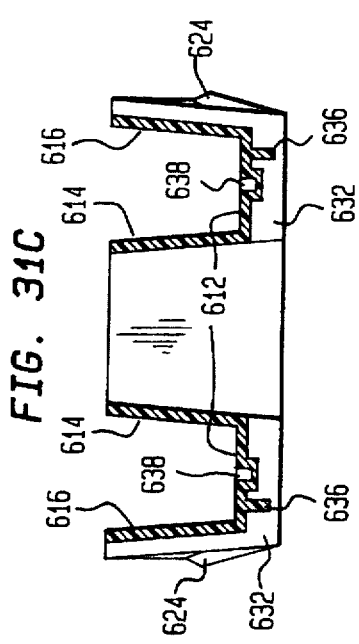

5,696,664

BASEPAN WITH INTEGRALLY FORMED POSTS FOR MOUNTING COMPONENTS BY HEAT STAKING

FIELD OF THE INVENTION

The present invention relates generally to electric load centers, and more particularly to an improved load center and load center components.

BACKGROUND OF THE INVENTION

Electric load centers suffer from a number of limitations. Assembling the various components of the load center such as the trim panel to the metal enclosure of the load center oftentimes requires an electrician to align the holes in these components, insert screws through the aligned holes, and screw each screw into the holes. Such activities are time consuming and are oftentimes not successful on the first attempt and have to be repeated several times. In accordance with an aspect of the present invention, a push-in screw holder fixture for the metal enclosure is provided which enables an electrician to easily secure the trim to the metal enclosure.

There is sometimes created an overpressure condition within a load center which can cause the door of prior art load centers to be forced open. In accordance with an aspect of the present invention, a new and improved latch is provided which, during an overpressure condition within the load center, causes the latch to engage the latch receptacle on the trim panel even more securely so that the door does not open.

Because load centers are constructed in varying sizes, for each size of load center constructed by a manufacturer, a separate inventory of basepans had to be manufactured and maintained. A need has therefore developed for basepans which are adaptable to various sized load centers and which are relatively inexpensive to manufacture. This need was partially met by the production and use of extruded basepans. Alternatively, individual modular auxiliary basepan pieces were constructed for interconnection to accomplish circuit breaker load centers of adjustable length. Because angular mounting of components is not well suited to robotic assembly, some prior art basepans and modular extensions have had to be adapted to be vertically down loaded to mating portions of the basepan, or have been adapted to be horizontally or laterally connected to mating portions of the basepan. Such attachment methods and modular construction may not be desireable and can result in imprecise spacing between the connected modular pieces, which may affect the subsequent assembly and installation of components to the basepan and the basepan to the enclosure. In accordance with an aspect of the present invention, new and improved basepan and modular extension basepan components are provided which can be robotically assembled, but need not be robotically assembled in solely a vertical drop-down mode or a lateral mode, and which reduce the possibility of misalignment and improper spacing between connected modular pieces.

Securing the basepan to the enclosure is oftentimes time consuming and cumbersome. In accordance with an aspect of the present invention, an improved basepan is provided having mounting features which facilitate the assembly of the basepan to the enclosure, thus saving time and labor.

It is well known in the art to provide an electrically insulative barrier between the bus bars of load centers. In accordance with an aspect of the present invention, an improved basepan having integrally formed electrical insulative barrier is provided between the bus bars which increases the protection from the occurrence of arc tracking as well as decreasing the possibility of sustaining the arc, once it has occurred.

Bus bars have been secured to the basepan by common fastening devices such as screws, bolts and snap-in fasteners (U.S. Pat. No. 4,536,823) which can be cumbersome, time consuming to apply, uneconomical, require extra parts, and most importantly can impart stresses to the component being secured and adversely effect the structural integrity of the component. Applying ultrasonic energy to posts which are integral parts of a plastic basepan as a means of deforming the post to secure bus bars to the plastic basepan is well known (U.S. Pat. No. 4,118,754). Heat staking as a means of securing components to a plastic basepan can be advantageous in overcoming the above-stated disadvantages of common fastening devices, but imparts stresses which concentrate at the face of the basepan where the base of the post intersects the basepan to form corners. Such stress can significantly impair the integrity of the connection by causing a fracture of the post, loss of the integrity of the connection, and a decrease in the service life of the basepan and the load center. In accordance with an aspect of the present invention, an improved basepan is provided having integrally formed posts for securing thereto components such as bus bars and the like by heat staking which reduces the stresses imparted to the posts and basepans from heat staking.

As is well known, it has been difficult for installers to secure return wires to the neutral bars of the prior art load centers because it is generally difficult to see the holes in the neutral bar into which the wires are to be placed. In order to improve the visibility of the holes in the neutral bar into which the return wires of the power circuits are to be inserted and secured, and thereby facilitate the connection of the neutral return wires to the neutral bars by the electrical installer, in accordance with an aspect of the present invention an improved neutral bar is provided which allows for viewing of the electrical connector apertures positioned in the side walls when viewed either directly overhead or from the side.

Also, prior art attachment methods between the neutral bar and the basepan are unsatisfactory. In accordance with an aspect of the present invention, the neutral bar is adapted to permit simplified assembly and mounting to the basepan. This is accomplished by providing a configuration of the neutral bar and an improved basepan to which the neutral bar is attached which does not require the use of screws or other separate fastening devices thereby reducing the number of components in the load center and facilitating the mounting of the neutral bar to the basepan.

Furthermore, in order to further facilitate the installation of the return wires to the neutral bars of the load center, in accordance with an aspect of the present invention, an improved basepan is provided having an integrally formed neutral bar wire guide which assists the electrician or installer in guiding the wires of power distribution circuits into the electrical connector apertures in the neutral bars.

In accordance with another aspect of the present invention, an improved neutral tie bar is provided which connects the neutral bars together. Some load centers of the prior art are not grounded because the installer or user neglects to do so. There is nonetheless a need to assure that there is no potential difference between the neutral and the ground. In accordance with this aspect of the present invention, the neutral tie bar is adapted to be capable of being electrically connected to the outer metal enclosure of the load center thereby eliminating any potential difference between the neutral and ground of the load center. Since each power company providing service maintains the potential of the neutral at or close to zero volts, the function of connecting the neutral of the load center to the ground is accomplished by electrically connecting the neutral tie bar to the metal outer enclosure.

In accordance with an aspect of the present invention, a new and improved main lug insulator or barrier is provided between the incoming service and the other components in the load center functions to: insulate each of the main lugs from the neutral bus bar, neutral tie bar, and neutral lug(s); reduce incidental shorting or inadvertent energization of current carrying conductors both during installation and subsequent operation; and maintain required over-surface and through-air spacing for cooling and expansion of the main lugs.

SUMMARY OF THE INVENTION

In accordance with the invention, the enclosure of the load center is adapted to receive and is fitted with a push-in screw holder fixture comprising an open ended u-shaped structure formed by folding a piece of sheet metal having; (a) an upper surface having two tabs formed therein, facing one another and directed inward and downward, each of said tabs having a free edge forming an opening therebetween for receiving the threads of a screw and which deflect upon axial pressure to form a one way opening, the upper surface further having two outwardly extending flanges; and (b) two sidewalls extending downward and substantially orthogonal from the upper surface, each of said sidewalls having a tab formed therein and directed outwardly and upwardly for clasping an edge of the hole between the upwardly and outwardly directed tab and the outwardly extending flange.

The door latch of the load center comprises a one-piece molded member disposed in an opening in the door, the one-piece member having a planar top with an indent for opening the latch, a body portion extending from an underside of the planar top which is slideably received in an opening in the door, the body portion having a flexible tongue extending in an upwardly direction at an angle away from the body and towards the free edge of the door. The one-piece molded member further includes a hook disposed from the underside of the top, the hook having a free end extending toward the tongue of the body for engaging an underside edge of a portion of a trim panel of the load center and which is adapted to form an aperture adjacent the opening in the door. The tongue urges the door latch towards the first edge of the door, keeping the hook biasedly engaged with the underside edge of the portion of the trim panel adapted to form the aperture.

The basepan of the load center is an integrally formed snap-on basepan comprising a one piece molded member having a planar surface for mounting the bus bars, at least one circuit breaker support rail extending upward from said planar surface for supporting the circuit breakers in the load center, the circuit breaker support rail having at one end an upper end wall and at a second end a lower end wall, said lower end wall being adapted to have a slot with an upper edge. The snap-on basepan having at least one modular extension mounting foot extending from the lower end wall for receiving a modular extension basepan to extend the length of the snap-on basepan. The modular extension mounting foot comprising an upper wall and two sidewalls and a front wall and a rear wall being arranged to form a hollow rectangular box, said rear wall being formed by the end wall of said circuit breaker support rail, the upper wall and one of the two sidewalls of the modular extension mounting foot having a trapezoidal shaped slot extending therethrough for engagement by a correspondingly shaped ramp of the modular extension basepan to align the modular extension basepan to the snap-on basepan. The upper wall of the modular extension mounting foot further including an aperture for passing therethrough a flexible snap hook extending from the modular extension basepan to engage the upper edge of the slot formed in the lower end wall of the circuit breaker support rail and to thereby secure the modular extension basepan to the snap-on basepan.

The basepan of the load center comprises a planar surface for the mounting of bus bars, the planar surface having a tab extending from an edge of the planar surface, the tab having a tapered lower edge and a prong extending from a side edge. The basepan further having ears extending from the planar surface and disposed toward opposite sides of the basepan, each of the ears having an aperture for the passage of a screw. The enclosure of the load center has a lance formed from a backwall, the lance having a free end disposed away from the backwall and into the interior of the enclosure for capturing the tab of the basepan, the enclosure further having a hole in the backwall for receiving a screw. As the basepan is being mounted to the enclosure, the tapered lower edge of the tab is captured between the lance formed in the backwall of the enclosure and the interior face of the backwall and the prong is engaged by an upper edge of the tab to stop the vertical movement of the basepan while the ears of the basepan are placed into abutting relation with the interior surface of the backwall for mounting by a screw through the aperture and into the correspondingly positioned hole in the enclosure.

The basepan of the load center comprises a planar surface for receiving first and second bus bars, the planar surface having two spaced apart substantially parallel walled members integrally formed with and extending substantially orthogonally upwards from the planar surface to form a continuous double-walled barrier between the first bus bar and the second bus bar.

The basepan of the load center comprises a surface to which a selected component of the load center is to be mounted, the surface having at least one integrally formed post for peening over by heat staking to secure the selected component to the basepan, wherein the integrally formed post has a torroidal shaped undercut extending around a periphery of the post at the intersection with the surface of the basepan.

In accordance with an aspect of the present invention, a neutral bar is provided having an elongated central body portion with a trapezoidal shaped cross-sectional area with outwardly sloping downwardly extending side walls, the side walls having a plurality of apertures for insertion of electrical wires, a top portion extending from the central body portion and having a plurality of tapped holes at least one of which is in communication with a corresponding one of the plurality of apertures in the side walls, and a base portion extending from the central body portion for mounting to the basepan.

The basepan of the load center comprises a surface member for mounting components of the load center and a channel for mounting a neutral bar having a plurality of electrical connector apertures for receiving neutral return wires, the surface member further including an integrally formed neural bar wire guide comprising a wall upwardly extending from the surface member, the wall having semicircular slots extending therethrough at an upper surface, each one of the semicircular slots for receiving a return wire and guiding the return wire therethrough and into a preselected one of the plurality of electrical connector apertures in the neutral bar.

An improved neutral tie bar for connecting together the neutral bars of a load center having a metal outer enclosure, the neutral tie bar comprising: (a) a center portion having two vertically offset laterally extending ends, each of said ends having an aperture for receiving a screw to secure each of said ends to a neutral bar; (b) a pair of first elevated members, each one of said pair of first elevated members being disposed between the center portion and one of said ends and adapted to form a branch neutral cable lug having a horizontally disposed bore for receiving a branch neutral cable, the branch neutral cable lug further having a vertically extending tapped bore in communication with the horizontally disposed bore, said vertically extending tapped bore for receiving a threaded clamping screw to secure the branch neutral cable; (c) a second elevated member disposed between one of said pair of first elevational portions and one of the vertically offset laterally extending ends, said second elevated member being adapted to form a neutral cable lug having a horizontally disposed bore for receiving a neutral cable, the neutral cable lug further having a vertically extending tapped bore in communication with the horizontally disposed bore, said vertically extending tapped bore for receiving a threaded clamping screw to secure the neutral cable. The neutral tie bar can be electrically connected to the metal outer enclosure of the load center.

A main lug insulator for an electric load center, comprising: a first and a second trough-shaped longitudinally extending compartment, each of said first and second compartments comprising a horizontally disposed platform from which extends two upstanding walls having first edges which form a first open end and having second edges which form an oppositely facing second open end; a first support leg extending downward from the first edges forming said first open ends; a second support leg extending downward from the second edges forming said second open ends; said first support leg being spaced apart and substantially parallel to said second support leg to form an open laterally extending space therebetween and below the platforms for positioning over a neutral tie bar of the load center.

BRIEF DESCRIPTION OF THE DRAWINGS

FIG. 29 is a sectional view of the neutral tie bar taken along line 29—29) in FIG. 30;

FIG. 30 is a top view of the neutral tie bar shown in FIG. 20;

FIG. 31A is a perspective view of the main lug insulator shown in FIGS. 1 and 20;

FIG. 31B is a top view of the main lug insulator;

FIG. 31C is a sectional view of the main lug insulator taken along line 31C—31C in FIG. 31B;

FIG. 31D is a rear elevational view of the main lug insulator shown in FIG. 31A; and FIG. 31E is a side view of the main lug insulator shown in FIG. 31A.

DETAILED DESCRIPTION OF THE INVENTION

Figure 1:
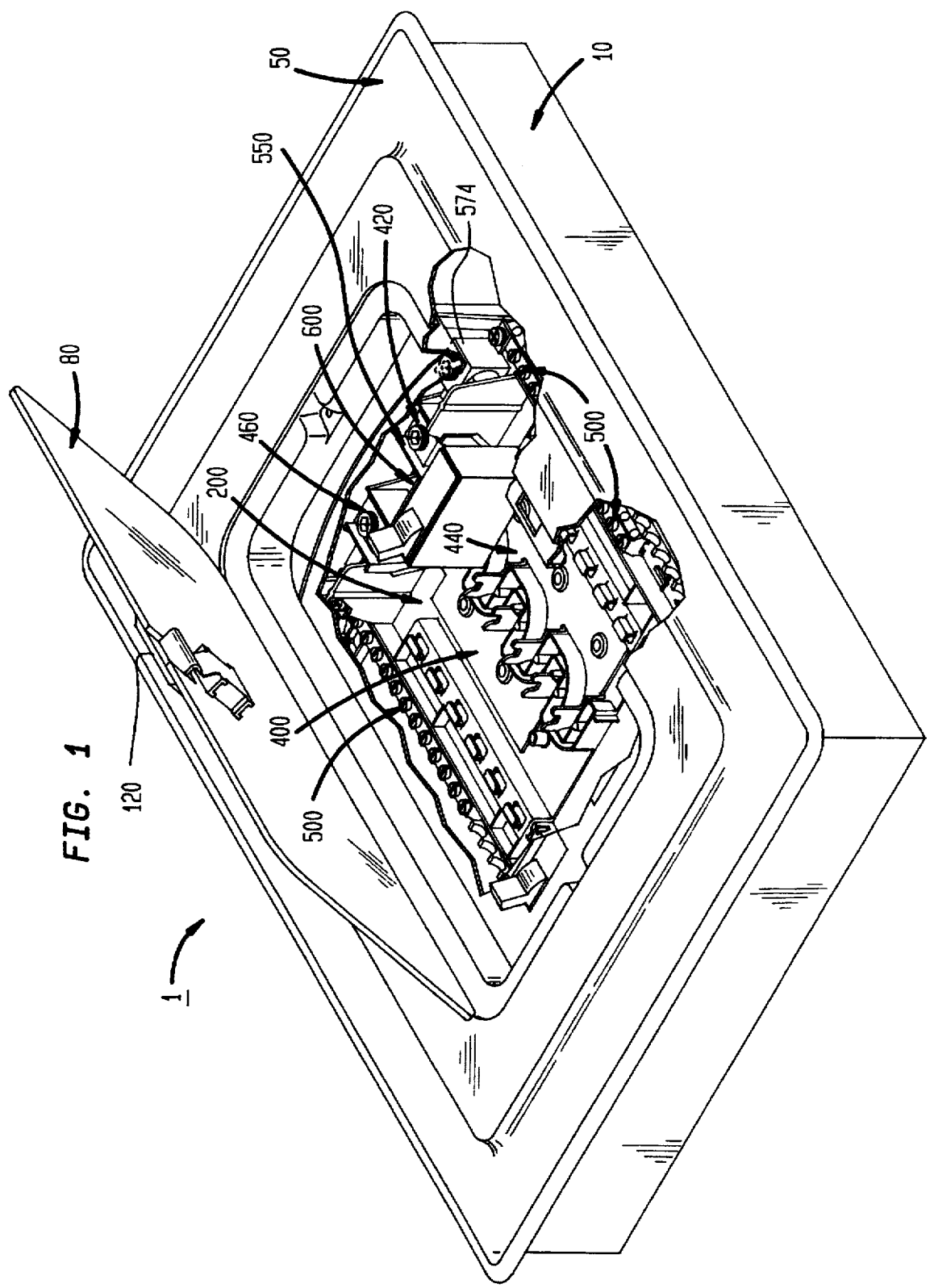
FIG. 1 is a perspective view of the load center incorporating the principles of the present invention.

Referring to the drawings, a load center for use in residential or light commercial applications is indicated in FIG. 1 by the reference numeral 1. The load center 1 includes an enclosure 10, trim panel 50, supporting basepan 200 mounted therein, door 80, door latch 120, bus bars 400 and 440, neutral bars 500, neutral tie bar 550, main lugs 420 and 460, neutral lug 574, main lug insulator 600, and distribution circuit breakers. Although not shown, load center 1 may alternatively include a main circuit breaker instead of direct main lug connectors 420 and 460 which connect the incoming service or main lines to the components of the load center and which functions to provide a means to interrupt power to the load center.

Figure 2:
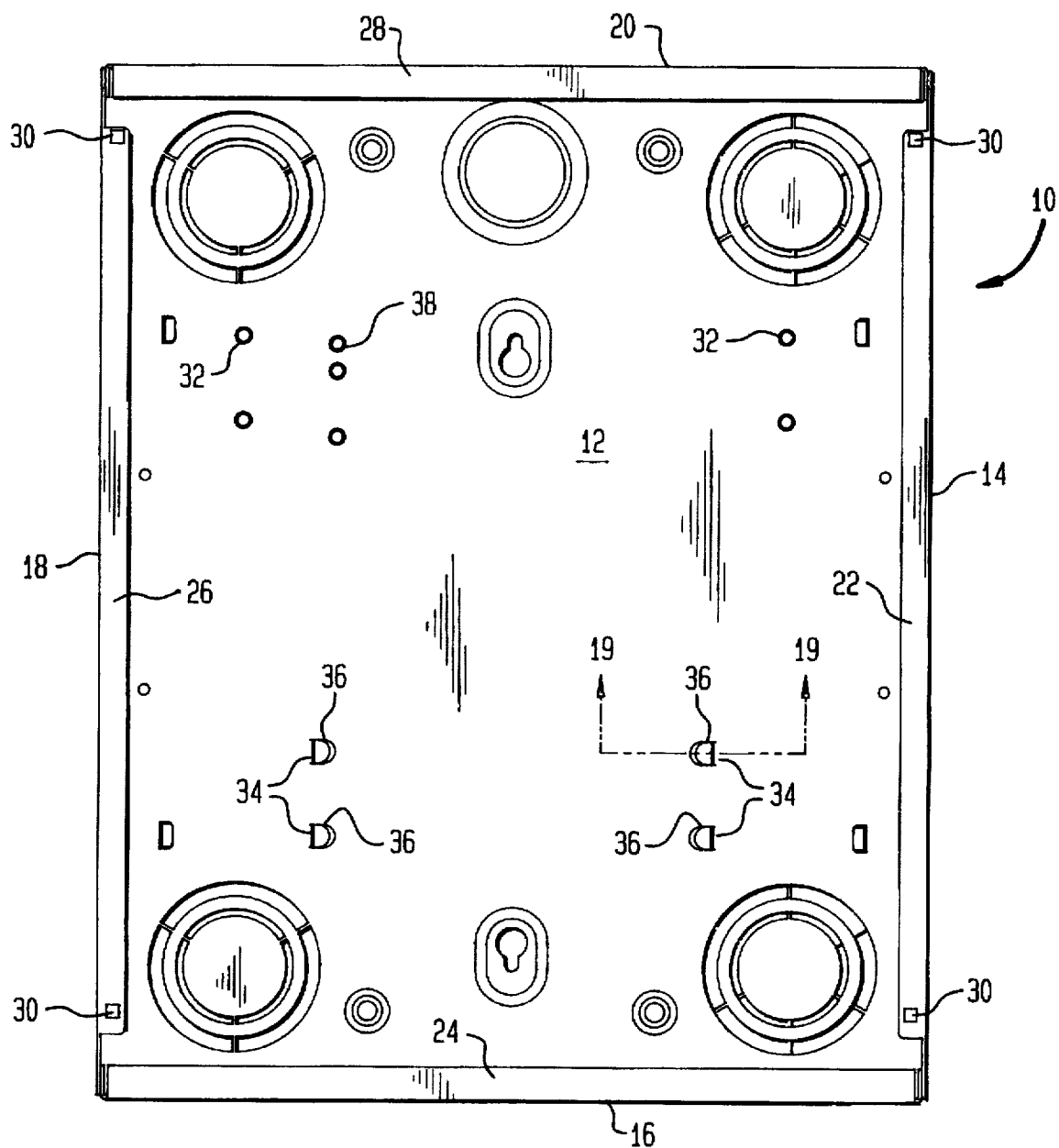
FIG. 2 is a plan view of the outer enclosure of the load center shown in FIG. 1.
Figure 3:
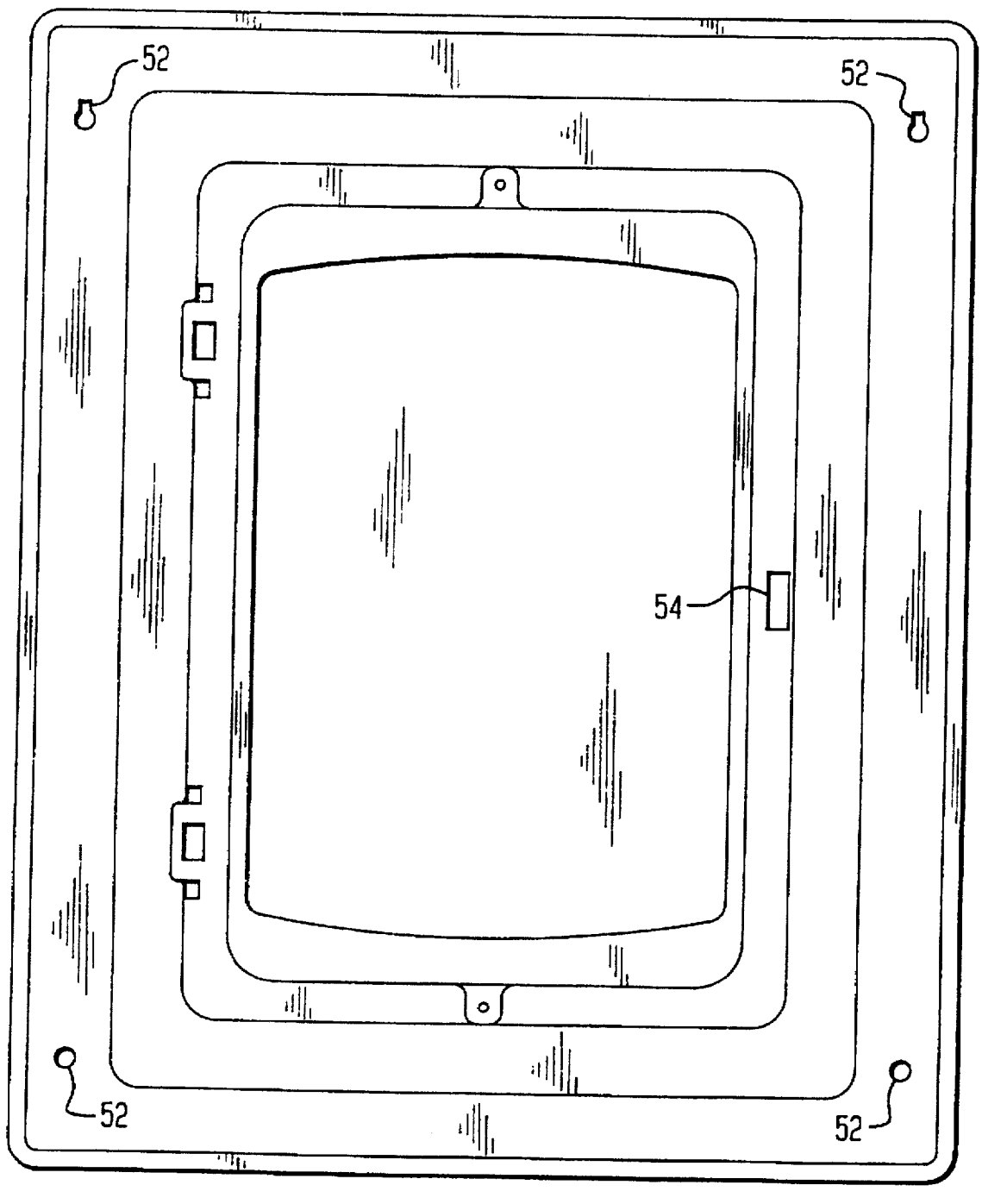
FIG. 3 is a plan view of the trim-panel which encloses the outer enclosure shown in FIG. 2.

Referring to FIG. 2, enclosure 10 comprises a backwall 12 and four integral sidewalls 14,16,18 and 20 which terminate in inwardly turned peripheral lips 22,24,26 and 28 respectively, surrounding an open front of enclosure 10. Enclosure 10 is typically manufactured from sheet metal in a series of operations including cutting, blanking, forming and welding. Enclosure 10 is typically installed between the wall studs of a building partition, so that the open side of the enclosure is flush with the partition outer surface. Enclosure 10 is covered by a trim panel 50 shown in FIG. 3 for flush fit with the enclosure and the partition. Trim panel 50 is attached to enclosure 10 with fasteners, such as screws, which pass through holes 52 formed in the trim panel and into peripheral lips 22 and 26 of sidewalls 14 and 18 shown in FIG. 2. The trim panel 50 has a hinged access door secured by a latch which allows access to the interior of the load center so as to permit user manipulation of circuit breaker actuation handles located in the load center.

When installing a trim panel to an enclosure of the prior art, the electrician generally has to align the holes formed in the trim panel with the corresponding holes located in the enclosure, insert screws through the aligned holes, and screw each screw into the enclosure. This task is time consuming and is oftentimes not successful on the first attempt and has to be repeated several times.

In accordance with an aspect of the present invention, enclosure 10 is adapted to receive and is fitted with a push-in screw holder fixture which enables an electrician to secure trim panel 50 to enclosure 10 by merely pushing a screw through the aperture 52 in the trim panel and into the push-in screw holder mounted in a lip of the enclosure.

Figure 4A:
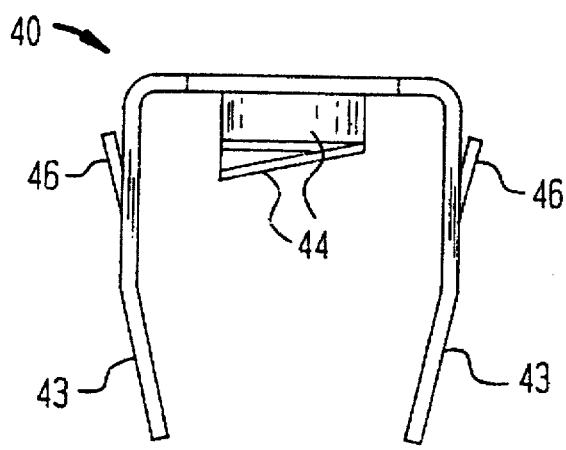
FIGS. 4A, 4B, and 4C are top and side views of a push-in screw holder.
Figure 4B:
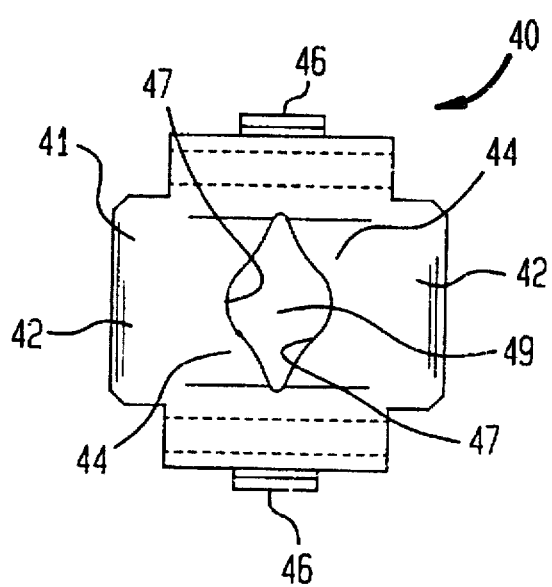
Figure 4C:
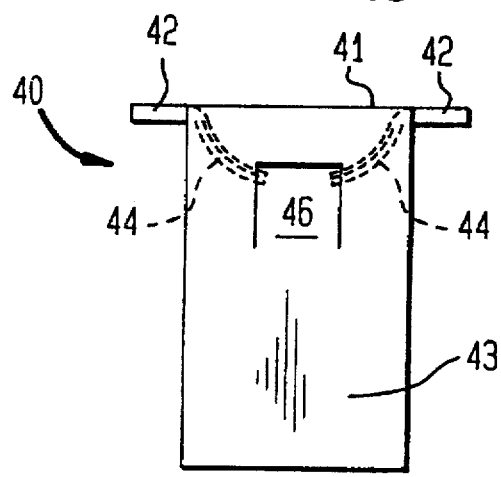

Referring to FIGS. 4A,4B and 4C, push-in screw holder 40 is shown and comprises an open ended, "U"-shaped structure, formed of a single piece of sheet metal where the U-shape is formed by folding the sheet metal to form an upper surface 41 and two sidewalls 43 extending from the upper surface. The upper surface 41 has two outwardly directed flanges 42. A one way opening 49 is formed in upper surface 41 by two tabs 44 directed inward and downward as more fully discussed below, to receive a threaded fastener. At each of two opposite sidewalls 43 is a cut out tab 46 directed outwardly and upwardly. A push-in screw holder fixture 40 is inserted within correspondingly shaped holes 30 in lips 22 and 26 (shown in FIG. 2). Outward extending flanges 42 aid in fixing the push-in screw holder 40 in place in hole 30 in the enclosure, clasping the edges of hole 30 between the outwardly extending flanges 42 and the upwardly and inwardly directed tabs 46.

At the time of installation of the trim panel 50 to enclosure 10, trim panel apertures 52 are aligned with push-in screw holders 40 in lips 22 and 26 of enclosure 10, and a screw is pushed through each of the trim panel fastener apertures 52 and into the one-way opening 49 in each of the push-in screw holders 40.

Inward and downward cut out tabs 44 of push-in screw holder 40 act as spring-loaded fingers or leaf springs which deflect upon the axial pressure being exerted by a screw being pushed into the push-in screw holder. The free edges 47 of tabs 44 forming opening 49 engage the threads of the screw thereby precluding linear withdrawal (i.e., pulling the screw out in the opposite direction to the direction of insertion) without rotation of the screw in a counterclockwise direction.

In the event of an overpressure condition within a load center which can be paused for example by a short circuit fault, the door of some prior art designed load centers can be caused to burst open. More specifically, the door can be bowed outward which can cause the door and therefore the latch mounted on the door of the prior art designs to move away from engagement with the latching receptacle generally located on the trim until the door latch becomes disengaged from the latching receptacle allowing the door to be pushed open by the overpressure condition. In accordance with an aspect of the present invention, a new and improved latch is provided which, during an overpressure condition within the load center, causes the latch to engage the latching receptacle on the trim even more securely so that the door does not disengage and open.

Figure 5:
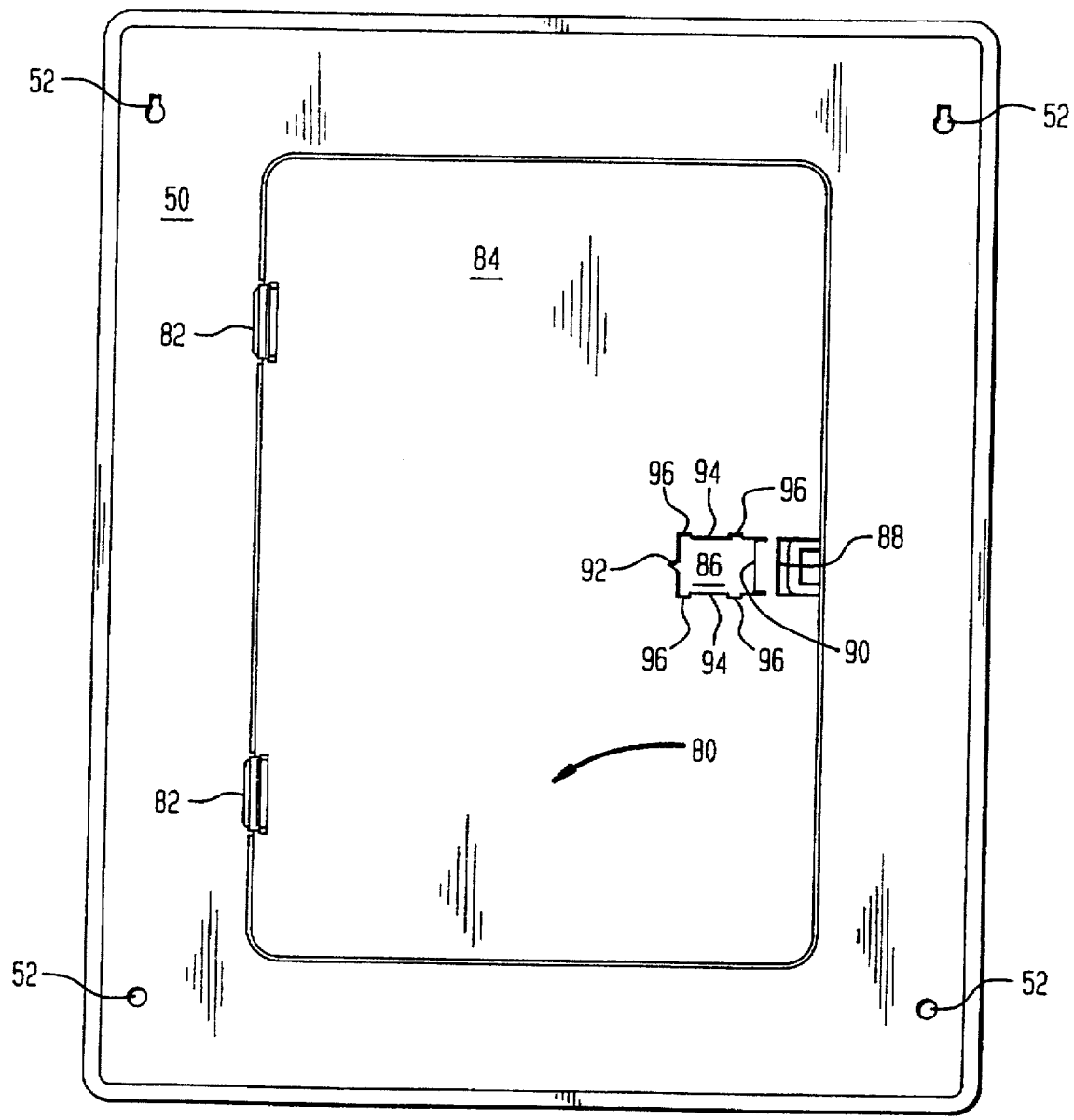
FIG. 5 is a front view of the door mounted to the trim panel shown in FIG. 3.

Referring to FIG. 5, door 80 is shown mounted to trim panel 50 by hinges 82. Mounted on face 84 of door 80 is door latch 120 shown in FIG. 6A. Door latch 120 is a one-piece molded member comprising a top 122 having an indent 124 for engagement of the operator's finger for opening and closing latch 120. Opening hatch 120 is accomplished by sliding door latch 120 along the face 84 of door 80. As shown in FIG. 6B, extending from the underside 126 of top 122 is a body portion 128 having a flexible tongue (or spring-like biasing member) 132 which extends in an upwardly direction from a lower portion of a sidewall 130 of body portion 128. Separately extending from the underside 126 of top 122 is a generally "L" shaped fixed hook (or jaw) 134. The free end 136 of hook 134 extends laterally in the direction of tongue 132.

Door 80 has a first-cut out or opening 86 (shown in FIG. 5) sized to permit body portion 128 of latch 120 to pass through door 80. As shown in detail in FIG. 6E, there is a lip 90 in door 80 formed by bending the metal cut by lances for lip 90. Tongue 132 rests on lip 90 of door 80. The underside 126 of top 122 is positioned on the surface of door face 84. Latch stop 138, shown in FIG. 6D, which extends from the underside 126 of latch 120 is positioned against dimple 92 of first cutout 86, as shown in FIG. 5. A second cutout 88 in door 80 is sized to permit "L" shaped fixed book 134 to pass through door 80.

Figure 6A:
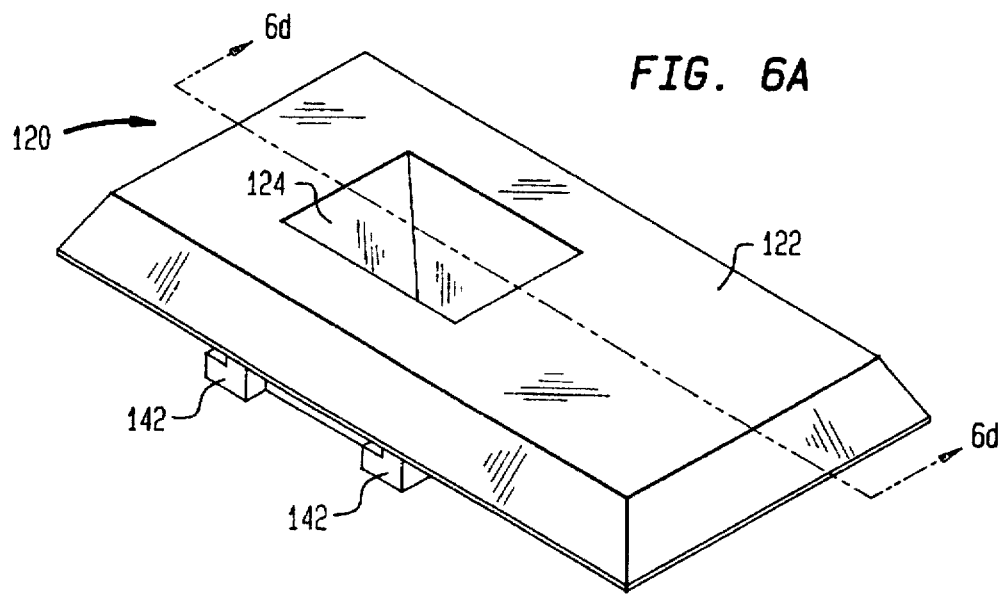
FIGS. 6A and 6B are perspective views of the door latch from above and below respectively.
Figure 6B:
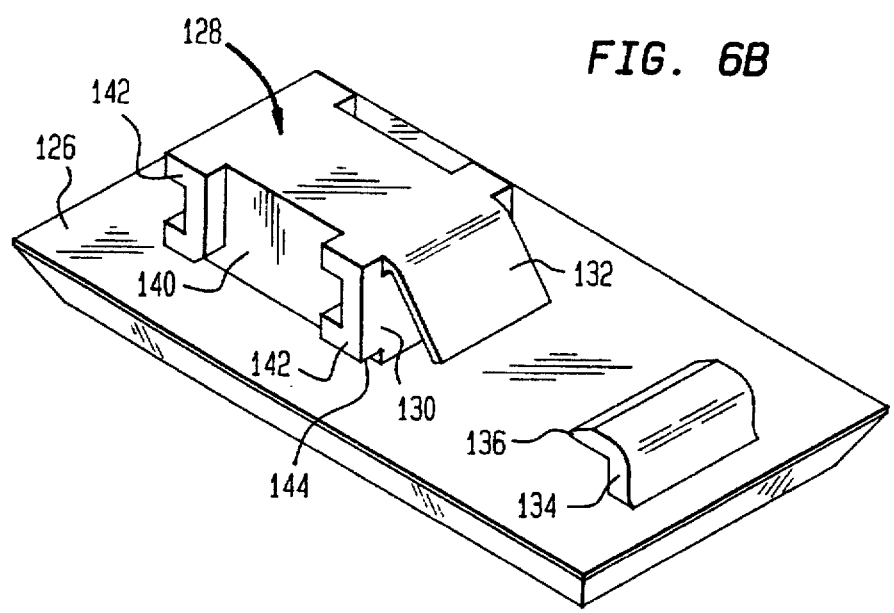
Figure 6C:
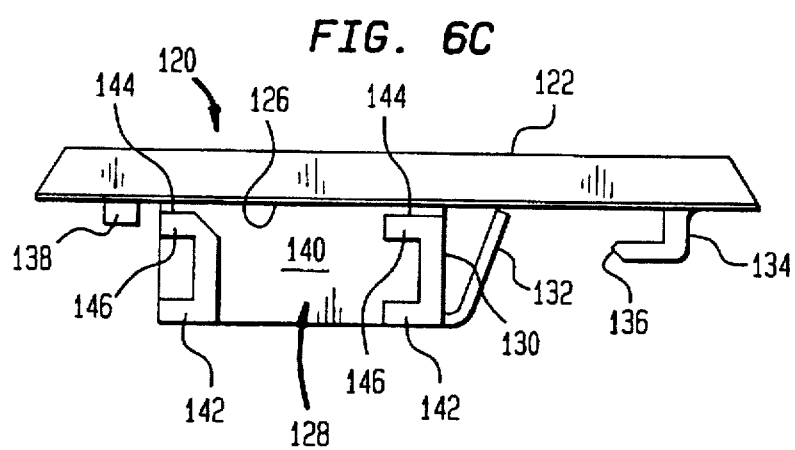
FIG. 6C is a side view of the door latch.
Figure 6D:
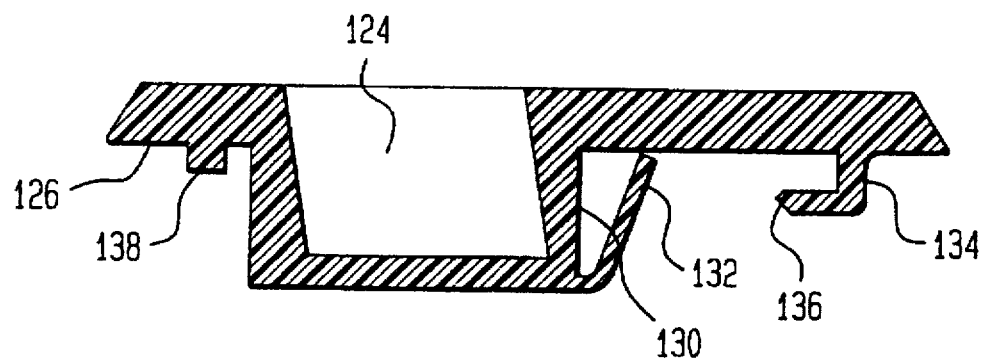
FIG. 6D is a sectional view of the door latch shown in FIG. 6A taken along line 6d—6d.
Figure 6E:
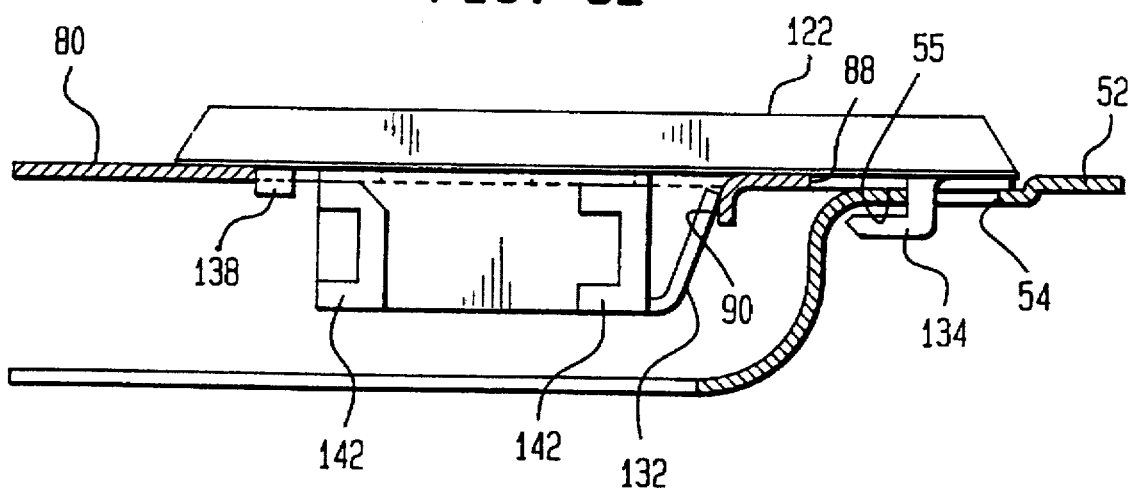
FIG. 6E is a sectional view of the door latch mounted to the door and secured closed to the door trim.

Body portion 128 of door latch 120 is adapted to form a track 144 on each of two sidewalls 140 to permit latch 120 to slide along the surface of door face 84 glided by edges 94 (shown in FIG. 5) of first cutout 86 from an engaged position shown by FIG. 6E to a disengaged position.

Extending from each of sidewalls 140 of body 128 are inverted "C" shaped projections. Tracks 144 are formed between the underside 126 of top 122 and the upper edge 146 of inverted "C" shaped projections 142. The inverted "C" shaped projections 142 fit into notches 96 shown in FIG. 5 in first cutout 86. After installation of door latch 120 in door 80, inverted "C"-shaped projections 142 are not aligned with notches 96 which thereby prohibit the removal of the door latch 120 from door 80.

Referring to FIG. 6E, door 80 is shown secured in a closed and latched position by door latch 120 with "L" shaped hook 134 which passes through second cutout 88 in door 80 and through aperture 54 in trim panel 52 (FIG. 3) to engage an underside edge 55 of aperture 54. In order to disengage latch 120 from its at rest closed position to enable the opening of door 80, the operator places one's finger in indent 124 of top 122 and slides the latch toward the "free" end of door 80 (i.e., in a direction away from the door hinges). As latch 120 is slid along face 84 toward the free end of door 80, flexible tongue (or basing member) 132 is compressed against lip 90 thereby causing that "L" shaped hook 134, which extends from the underside 126 of latch 120 and which is faced inward towards hinges 82, to move out of engagement with underside 55 of door 80 formed around aperture 54 and into vertical alignment with aperture 54 so that "L"-shaped hook 134 can pass freely through aperture 54 thereby enabling the opening of door 80.

Latch 120 is maintained in a latched position by flexible tongue 132 pressing against lip 90. The pressure of flexible tongue 132 against lip 90, which keeps latch 120 in a closed position, is maintained by stop 138 extending from the underside 126 of latch 120. Thus, latch 120 is in a biased closed position and, since "L" shaped fixed hook 134 is faced inward toward hinges 82 of the door 80, latch 120 remains in a biased closed position even if door 80 bows outwardly during an overpressure condition within the load center 1.

Disposed within enclosure 10 is a basepan 200 to which is mounted the various components of the load center. Basepan 200 is made out of an electrically insulative material which can be injection molded or extruded. One example of such material is a thermoplastic material sold under the trademark Noryl by General Electric Company. Since load centers are constructed by a manufacturer in various sizes, a separate inventory of basepans had to be manufactured and maintained for each size load center. To decrease the expense and the need to maintain varying sizes of basepans, an extruded basepan of the type described in U.S. Pat. Nos. 4,449,296 entitled "Method of Forming Electric Distribution Panel", 4,536,823 entitled "Electric Panel Board Having An Improved Extruded Basepan Configuration", 4,740,865 entitled "Extruded Three-Phase Basepan Configuration For a Load Center", and 5,081,560 entitled "Load Center Enclosure" were introduced. Also, one or more individual modular auxiliary basepan pieces have been constructed for interconnection to form circuit breaker load centers of adjustable length. Such modular basepan pieces are shown in U.S. Pat. Nos. 4,646,198, 5,450,282 and 4,251,851. Because of difficulties involved in robotic assembly of the components of the load center which require angular mounting, particularly molded basepans and modular extensions to provide basepans of varying length, and because of difficulties in assembling or securing components to the basepan, modular extensions have been designed and manufactured in the prior art to avoid the need for angular mounting. That is, modular extensions have been adapted to be vertically down loaded to mating portions of the basepan or have been adapted to be horizontally or laterally connected to mating portions of the basepan.

Such prior art attachment methods and modular constructions suffer from possible misalignment and improper spacing between the connected pieces, which can affect the subsequent assembly and installation of components to the basepan. It would therefore be an advantage over the prior art to have modular extension basepan components which need not be assembled in solely either a vertical drop-down mode or a lateral connected mode, which reduce the possibility of misalignment and improper spacing between connected modular pieces, and which can nevertheless be robotically assembled.

Figure 7:
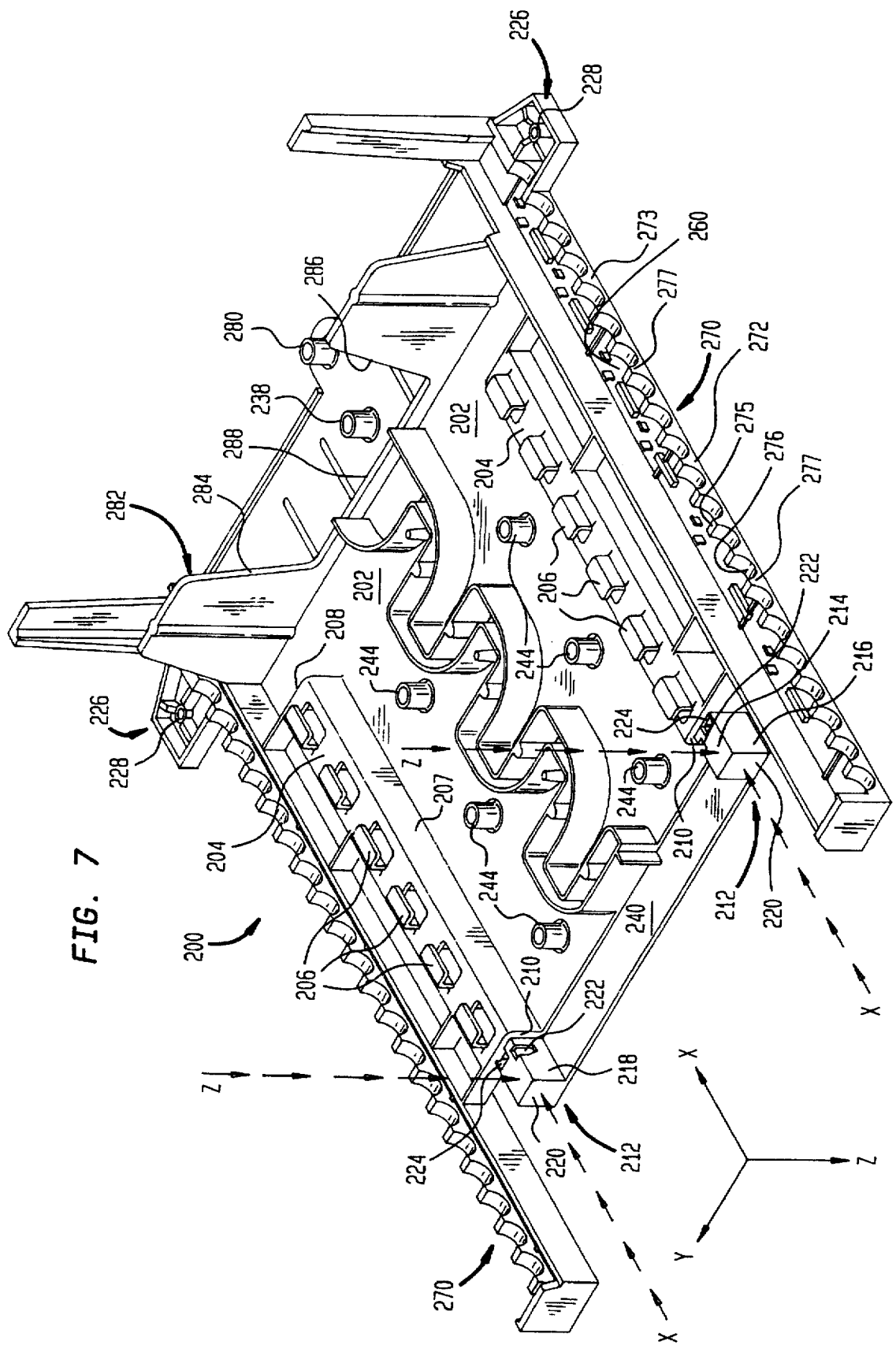
FIG. 7 is an isolated perspective view of the basepan shown in FIG. 1.
Figure 8:
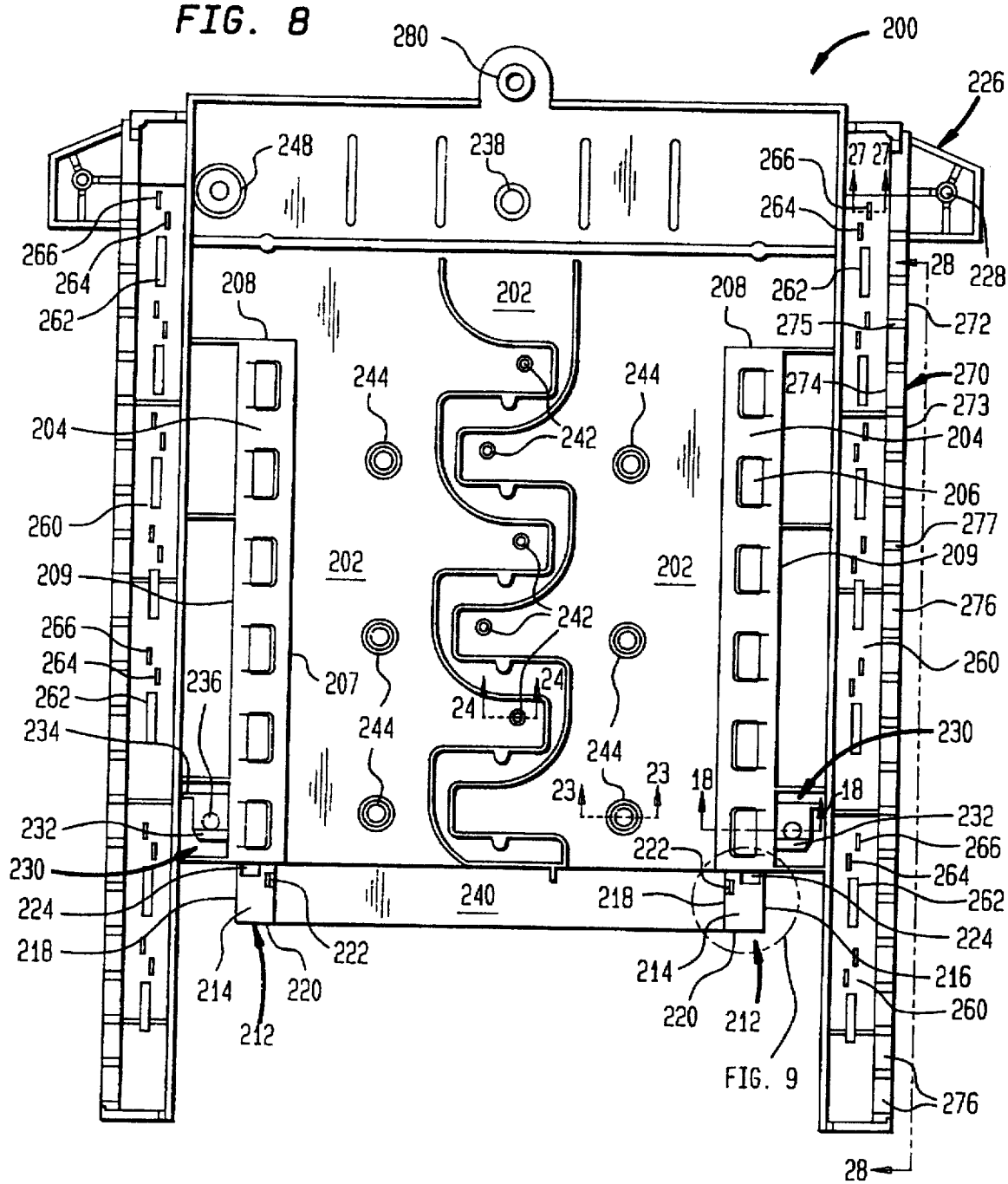
FIG. 8 is a top plan view of the basepan shown in FIG. 7.

Referring to FIGS. 7 and 8, there is provided a snap-on basepan 200 having a surface 202 upon which bus bars 400 and 440 are to be mounted, and circuit breaker support rails 204 from which extend circuit breaker support hooks 206 for mounting and supporting circuit breakers. Each of the circuit breaker support rails 204 has an upper end wall 208, and a lower end wall 210. In accordance with an aspect of the present invention, an improved basepan 200 is provided having a modular extension mounting foot 212 which extends from lower end wall 210 and upon which a modular extension basepan 300 (shown in FIG. 12) can be mounted in order to extend the length of snap-on basepan 200, and thereby enable a greater number of circuit breakers to be installed within the load center 1. Modular extension basepan 300 is also made out of an electrically insulative material which can be injection molded or extruded such as Noryl.

Figure 9:
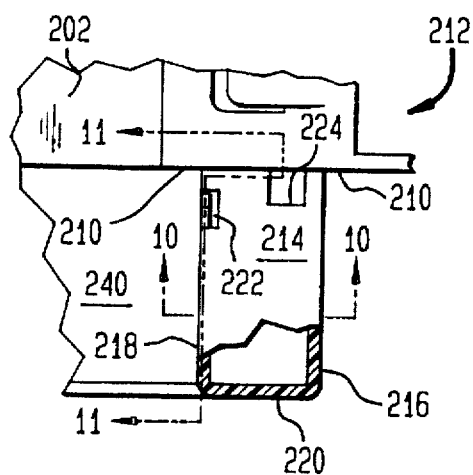
FIG. 9 is an enlarged plan view of a modular extension mounting foot of the basepan shown in FIGS. 7 and 8.
Figure 10:
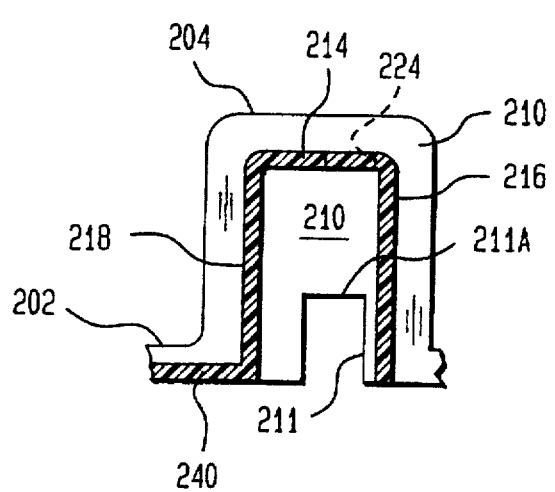
FIG. 10 is a sectional view of the modular extension mounting foot taken along line 10—10 in FIG. 9.
Figure 11:
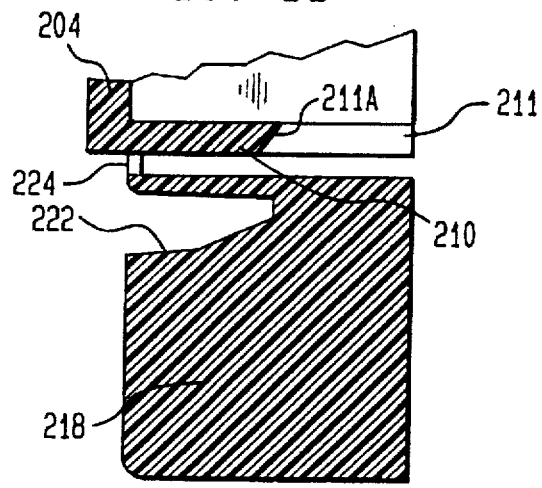
FIG. 11 is a sectional view of the modular extension mounting foot taken along line 11—11 in FIG. 9.

Referring to FIGS. 9 and 10, modular extension mounting foot 212 is in the shape of a hollow rectangular box having an upper wall 214, two sidewalls 216 and 218, front wall 220, and a rear wall formed by lower end wall 210 of circuit breaker support rail 204. Extending between modular extension mounting feet 212 and from the lower edge of surface 202 is a depressed platform 240 for mounting of a matching recessed edge 332 of upper surface 302 of modular extension basepan 300. A trapezoidal shaped alignment slot 222, formed in upper wall 214 and sidewall 218 of foot 212 (shown in FIG. 9 and best seen in FIG. 11) is provided to be engaged by a correspondingly shaped alignment ramp 304 of modular extension basepan 300 (shown in FIG. 13 and best seen in FIG. 14) and thereby pulls modular extension basepan 300 toward and aligns with snap-on basepan 200 when modular extension basepan 300 is mounted to snap-on basepan 200. This properly positions modular extension basepan 300 to snap-on basepan 200 for securing them together as more fully described below. In order to secure modular extension basepan 300 to snap-on basepan 200, upper wall 214 of mounting foot 212 has an aperture 224 to allow a flexible snap hook 306 (FIGS. 13 and 14) of modular extension basepan 300 to pass and engage an upper edge 211A of slot 211 formed in end wall 210 (FIG. 10) of circuit breaker support rail 204 when modular extension basepan 300 is mounted to snap-on basepan 200.

Figure 12:
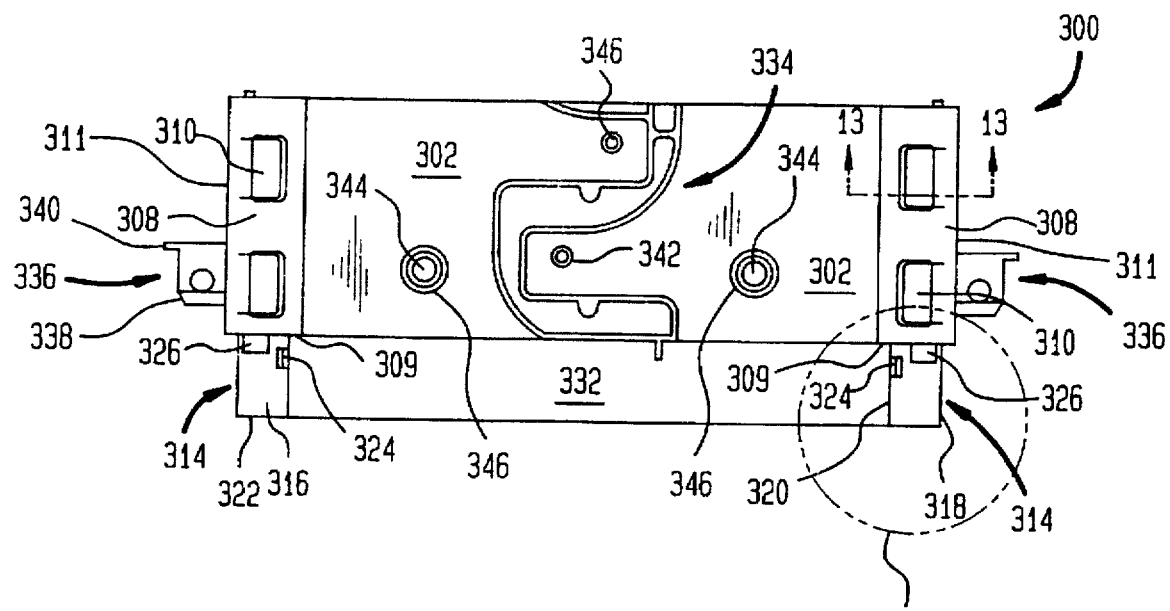
FIG. 12 is a top plan view of a modular extension basepan for connection to the basepan shown in FIGS. 7 and 8.

Modular extension basepan 300 is configured to be substantially similar to snap-on basepan 200 in providing, for example, an upper surface 302, circuit breakers support rails 308, circuit breaker support hooks 310, double-walled serpentined bus bar barrier 334, integrally formed solid posts 342 and integrally formed hollow posts 344, and mounting tabs 336 (for mounting snap-on basepan 200 and modular extension basepan 300 to the metal enclosure 10 (FIG. 12).

Figure 13:
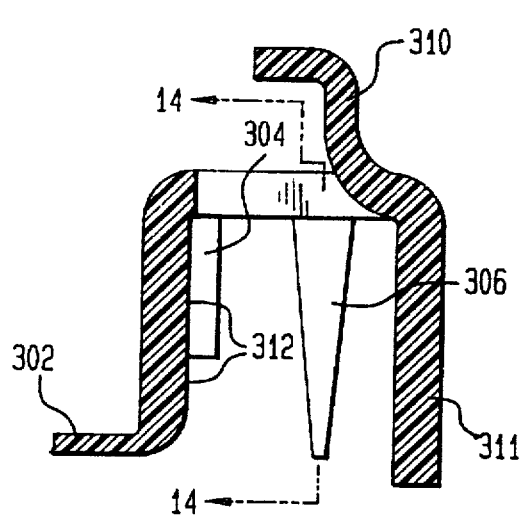
FIG. 13 is a sectional view of the modular extension basepan taken along line 13—13 in FIG. 12.
Figure 14:
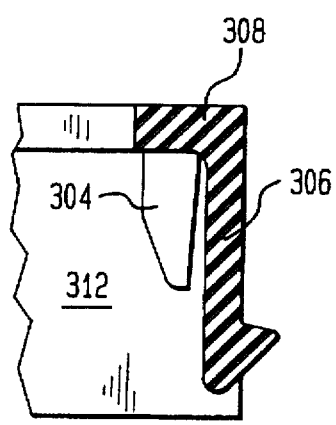
FIG. 14 is a sectional view of a portion of the modular extension basepan taken along line 14—14 in FIG. 13.

Modular extension basepan 300 includes circuit breaker support rails 308 having a cross-sectional shape of an inverted "U" (FIGS. 13 and 14). On an inside wall 312 of circuit breaker support rail 308 at the proximate end of modular extension basepan 300 which is to be attached to the lower end of basepan 200, is trapezoidal shaped alignment ramp 304 (FIGS. 13 and 14) which is complementary in shape and size to trapezoidal shaped alignment slot 222 and positioned so that as modular extension basepan 300 is mounted to snap-on basepan 200, trapezoidal shaped ramp 304 is guided by trapezoidal slot 222 initially in a downward or Z-plan direction (shown by the "Z" arrows in FIG. 7), and then laterally or horizontally in an X direction (shown by the "X" arrows in FIG. 7). This causes the modular extension basepan 300 to be brought into abutting alignment with snap-on basepan 200. At the same time, flexible snap hook 306 (FIGS. 13 and 14) passes through hole 224 (FIG. 9) and engages edge 211A of slot 211 (FIGS. 10 and 11) in lower end wall 210 of circuit breaker support rail 204 thereby securing modular extension basepan 300 to snap-on basepan 200.

The result of causing modular extension basepan 300 to move in both a vertical Z-direction and virtually simultaneously in a horizontal X-direction during mounting of modular extension basepan 300 before securing to snap-on basepan 200, is a closer and more accurate fit between the modular extension basepan 300 and the snap-on basepan 200 which in turn enables the accurate mounting of load center components to the assembled basepan.

Figure 15:
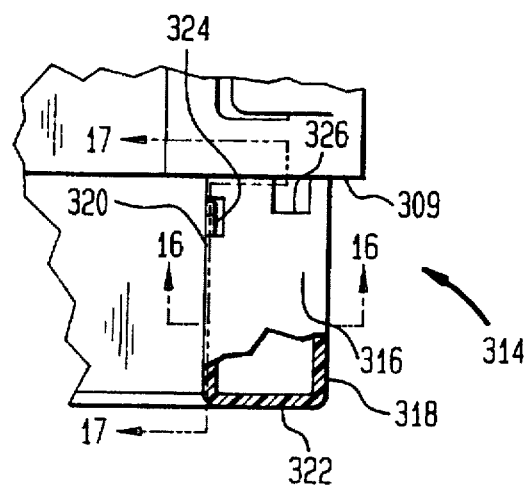
FIG. 15 is an enlarged plan view of the mounting foot of the modular extension basepan shown in FIG. 12.
Figure 16:
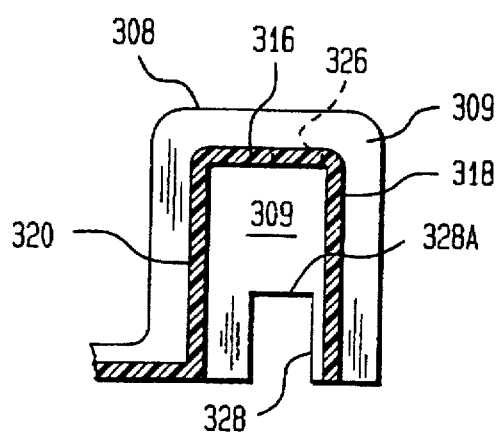
FIG. 16 is a sectional view of a portion of the mounting foot taken along line 16—16 in FIG. 15.
Figure 17:
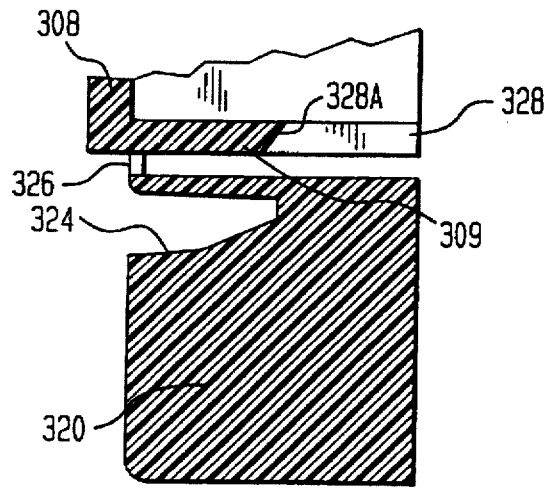
FIG. 17 is a sectional view of a portion of the mounting foot taken along line 17—17 in FIG. 15.

The distal end of modular extension basepan 300, which end is furthest away from the lower end of snap-on basepan 200, is configured to be substantially identical to the lower end of snap-on basepan 200. This configuration enables the successive attachment of modular extension basepans 300 to one another. Thus; referring to FIG. 12, modular extension basepan 300 has at its distal end two modular extension mounting feet 314 each in the shape of a hollow rectangular box having an upper wall 316, two sidewalls 318 and 320, front wall 322, and a rear wall formed by end face 309 of circuit breaker support rail 308. A trapezoidal shaped alignment slot 324 is formed in upper wall 316 and side wall 320 in mounting feet 314 (FIGS. 15 and 16). Upper wall 316 has an aperture 326 and end wall 309 of circuit breaker support rail 308 has a slot 328 having an upper edge 328A (as does modular extension mounting foot 212 of basepan 200). Extending between modular extension mounting feet 314 is a depressed platform 330.

These elements and features of the snap-on basepan and modular extension basepan facilitate the robotic mounting of one to the other while providing for an accurate fit to one another.

In accordance with another aspect of the present invention, the portion of the enclosure to which a basepan is to be secured, and the corresponding portion of the basepan which is used to secure the basepan to the enclosure, are improved so as to decrease the costs of their manufacturing and facilitate the assembly of the basepan to the enclosure.

Figure 18:
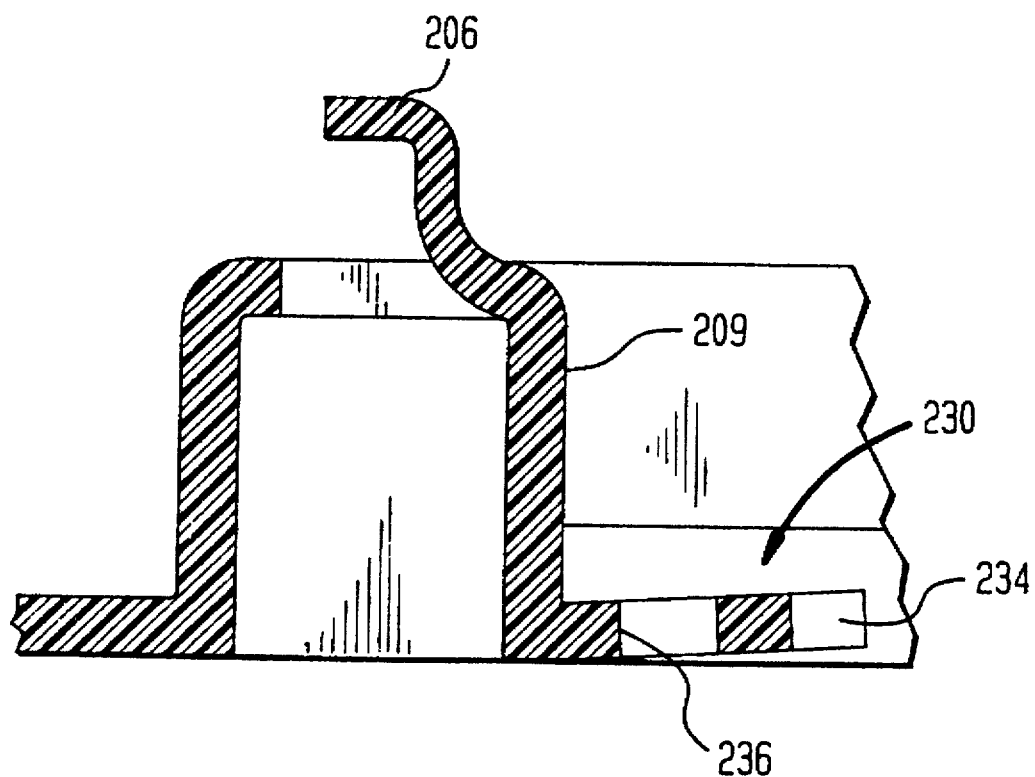
FIG. 18 is a sectional view of the basepan taken along line 18—18 in FIG. 8.
Figure 19:
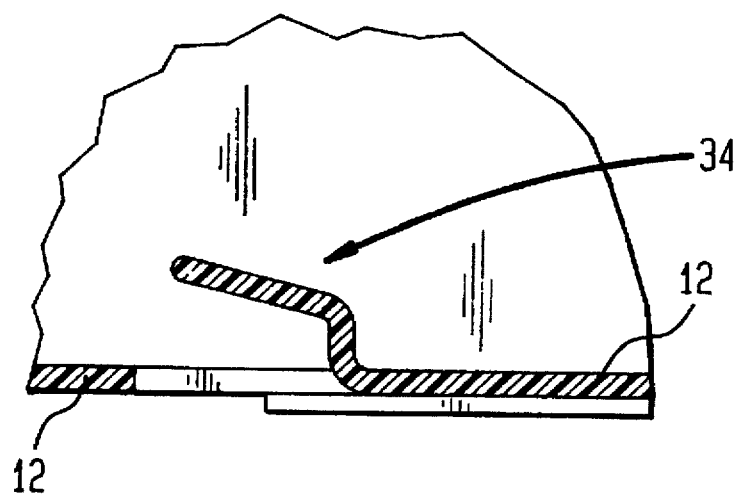
FIG. 19 is a sectional view of the enclosure taken along line 19—19 in FIG. 2.

Referring to FIGS. 7 and 8, basepan 200 is shown having ears 226 disposed on opposite sides and each ear has an aperture 228 for mounting by a screw to a correspondingly positioned hole 32 in enclosure 10. Snap-on basepan 200 is also provided with tabs 230 extending laterally from outer wall 209 of each circuit breaker support rail 204 (FIGS. 8 and 18). Each tab 230 has a tapered lower edge 232 for capture between a lance 34 formed in the backwall 12 of enclosure 10 and the interior face of backwall 12. Tab 230 has a prong 234 extending laterally from a side edge which is stopped by upper edge 36 of lance 34 thereby stopping the vertical movement of basepan 200 as it is installed in enclosure 10 (FIG. 2). Lances 34 are stamped or cut from the backwall 12 of enclosure 10 and bent into the interior of enclosure 10 as shown in FIG. 19. The free ends of lances 34 face one another, and capture tapered lower edge 232 of tab 230 when basepan 200 is being installed within enclosure 10. Prongs 234 which extend from the side of each tab 230 are engaged by the upper edge 36 of lances 34 to stop the vertical movement of basepan 200 during installation of the basepan to enclosure 10 while ears 226 of basepan 200 are placed into abutting relation with the interior surface of backwall 12 of enclosure 10.

Modular extension basepan 300 is also provided with tabs 336 extending laterally from outer wall 311 of each circuit breaker support rail 308 (FIG. 12) and are otherwise structurally and functionally the same as tabs 230 of snap-on basepan 200. Each tab 336 has a tapered lower edge 338 and a prong 340 extending laterally from side edge 311 for capture between a lance 34 and the interior face of backwall 12. When modular extension basepan 300 has been mounted and secured to snap-on basepan 200, tabs 336 and tabs 230 are captured by lances 34. The assembled modular extension basepan 300 and snap-on basepan 200 is installed within and secured to enclosure 10 in the same way as basepan 200 alone is installed in enclosure 10. The free end of lance 34 captures tapered lower edge 338 and upper edge 36 stops the vertical movement of basepan 200 by capturing prong 340. Apertures 228 in ears 226 are brought into alignment with correspondingly positioned holes 32 in backwall 12 and receive a screw which retains the top end of basepan 200 to enclosure 10.

Figure 20:
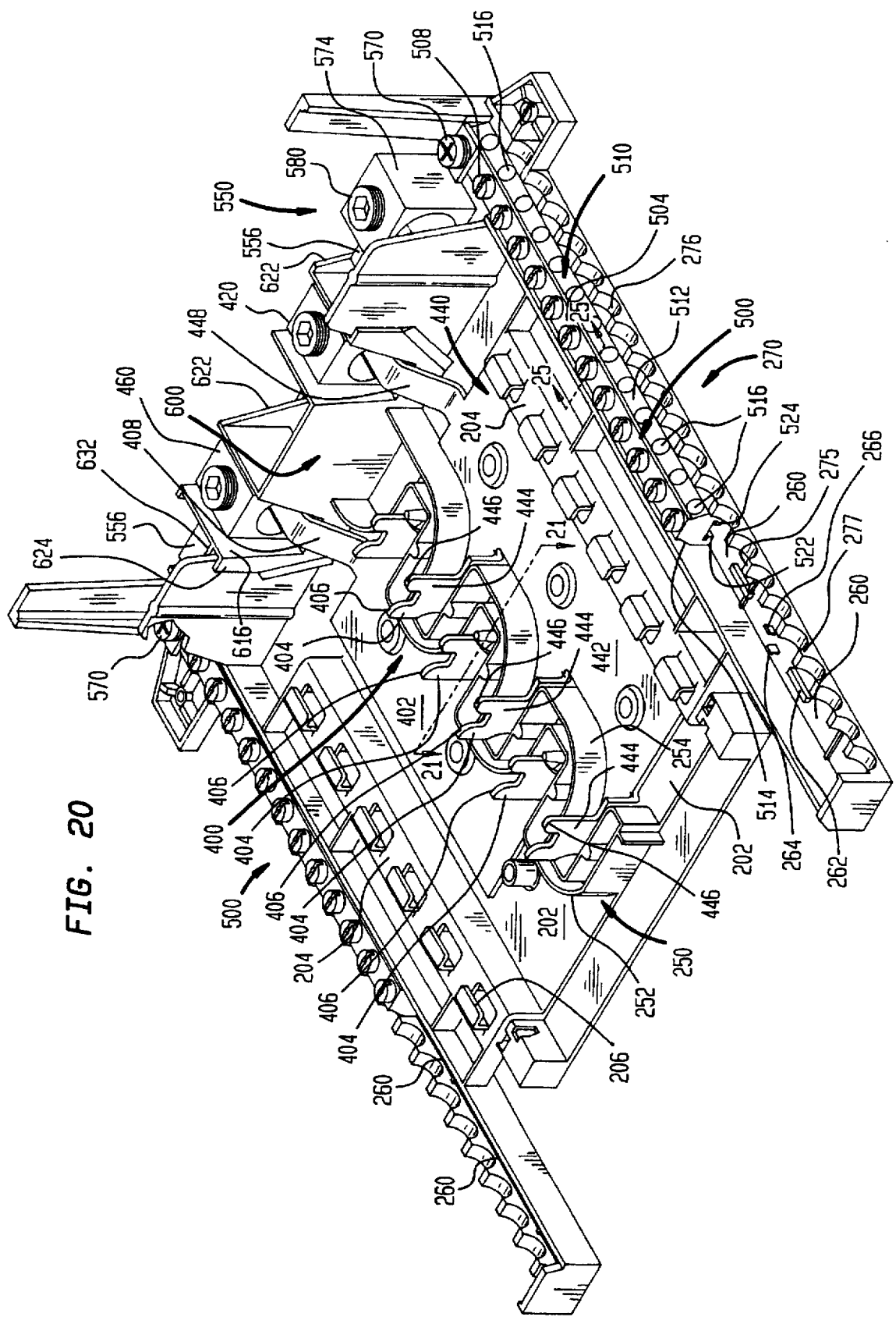
FIG. 20 is a perspective view of the interior components of the load center in FIG. 1 showing the basepan with circuit breakers removed.

Bus bars 400 and 440, which function to interconnect the line supply with the distribution circuit breakers, have planar bus bars 402 and 442 with integrally formed stabs or contact blades 404 and 444, respectively. Stabs 404 and 444 extend in parallel planes perpendicular to the longitudinal axis of each bus bar and are aligned in a row in a interleaved face-to-face relation as shown in FIG. 20. Distribution circuit breakers are electrically connected to the free end 406 and 446 of stabs 404 and 444, respectively, and are supported in basepan 200 at one end by circuit breaker support rail 204 and at their other ends by barrier 250. The free ends 404 and 446 of each of stabs 404 and 444 are mechanically and electrically connected within recesses in the distribution circuit breakers and precludes a line to line short from occurring between a stab of bus bar 400 to a stab of bus bar 440. Since the positioning of the distribution circuit breakers on the stabs of the bus bars cannot preclude the possibility of a line to line short from occurring between one bus bar to the other bus bar, it is known in the art to provide an electrically insulative barrier between the bus bars which increases the distance of the short circuit path, thereby decreasing the possibility that a short will occur.

Figure 21:
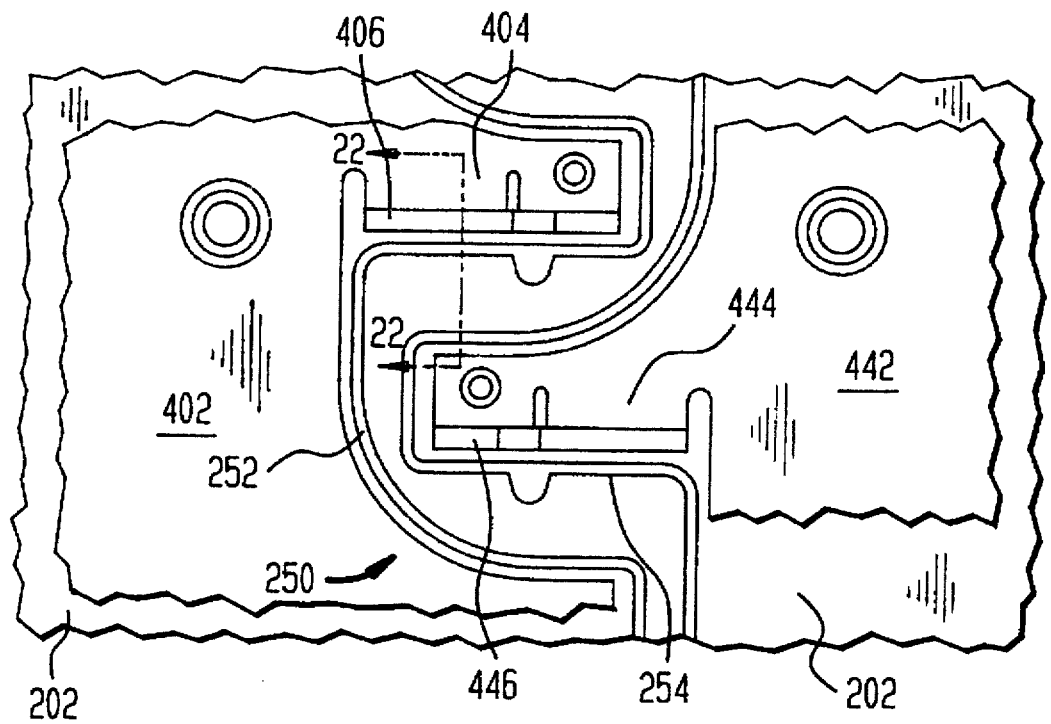
FIG. 21 is an enlarged plan view looking down on a portion of the basepan shown in FIG. 20 taken along line 21—21.

In accordance with an aspect of the present invention, a double-walled serpentined electrical insulative barrier 250 between bus bars 400 and 440 is provided which increases the protection from the occurrence of a short, as well as decreasing the possibility of sustaining the short, once it has occurred. Referring to FIGS. 20 and 21, double-walled serpentined electrical insulative barrier 250 is shown comprising walls 252 and 254 integrally formed with and extending substantially orthogonally upwards from planar surface 202 of basepan 200 and are positioned on basepan 200 to provide a continuous double-walled physical barrier between bus bars 400 and 440.

Figure 22:
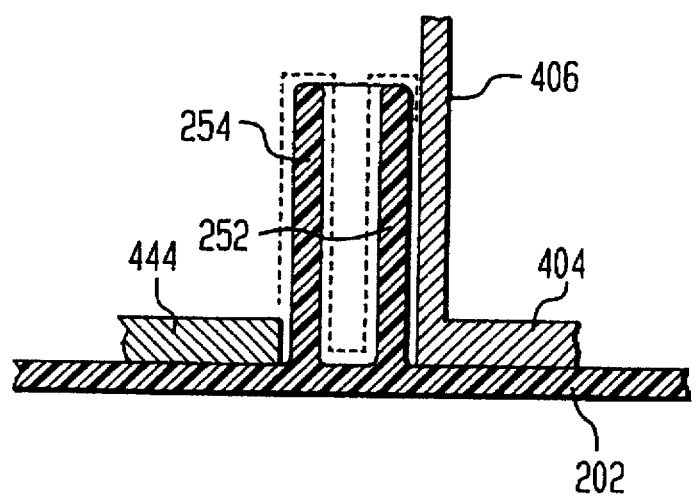
FIG. 22 is a sectional view taken along line 22—22 in FIG. 21 showing a double walled serpentine barrier between the bus bars.

Double-walled serpentined electrical insulative barrier 250 doubles the distance that an arc must travel between planar busses 402 and 442 which decreases the possibility that arc tracking might occur as compared to the prior art devices. Furthermore, doubling the distance that an arc must travel also decreases the possibility of arc tracking, once it has occurred, from being able to reoccur. The circuitous path that the arc must travel over and around walls 252 and 254 of barrier 250 as depicted by the dashed line in FIG. 22 also decreases the possibility that an arc will track due to the length of the potential arc tracking path.

Bus bars have been secured to the basepan by common fastening devices such as screws, bolts and snap-in fasteners (U.S. Pat. No. 4,536,823) which can be cumbersome, time consuming, uneconomical, require extra parts and most importantly, can impart stresses to the component being secured and adversely effect the structural integrity of the basepan.

Applying ultrasonic energy to posts which are integral parts of a plastic basepan as a means of deforming the post to secure bus bars to the plastic basepan is well known (U.S. Pat. No. 4,118,754). Heat staking as a means of securing components to a plastic basepan can be advantageous in overcoming the above-stated disadvantages of common fastening devices, but imparts stresses which concentrate at the face of the basepan where the base of the post intersects the basepan to form corners. Such stress can significantly impair the integrity of the connection leading to a fracture of the post, loss of the integrity of the connection, and a decrease in the service life of the basepan and the load center.

Figure 23:
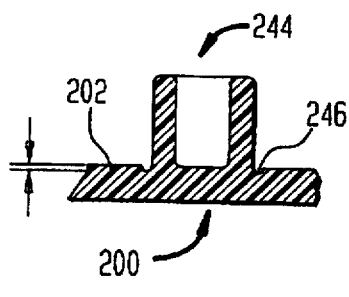
FIG. 23 is a sectional view taken along line 23—23 of the integrally formed hollow post shown in FIG. 8.
Figure 24:
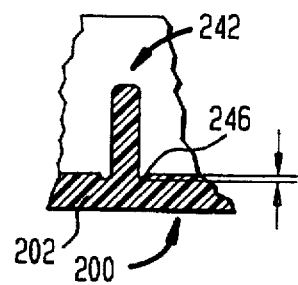
FIG. 24 is a sectional view taken along line 24—24 of the integrally formed solid post shown in FIG. 8.

According to an aspect of the invention, an improved basepan having integrally formed posts fox securing thereto components such as bus bars and the like by heat staking is provided, which improvement avoids imparting stresses to the posts. Referring to FIG. 8, basepan 200 is shown having integrally formed solid posts 242 and integrally formed hollow posts 244 for mounting of bus bars 400 and 440. Referring to FIG. 23 (which is a sectional view of a hollow post and the basepan), hollow post 244, which is integrally formed with surface 202 of basepan 200, is shown having a torroidal shaped undercut 246 extending around the periphery of hollow post 244 at its intersection or juncture with surface 202. Torroidal shaped undercut 246 eliminates sharp corners at the intersection or juncture between hollow post 244 and surface 202 thereby reducing the stress concentration which can render hollow post 244 susceptible to fracture from surface 202 due to heat staking. As shown in FIG. 24, solid post 242 similarly has a torroidal shaped undercut 246 extending around its periphery at its intersection with surface 202. Torroidal shaped undercuts 346 are similarly provided with integrally formed solid posts 342 and integrally formed hollow posts 344 of modular extension basepan 300 (FIG. 12).

Figure 25:
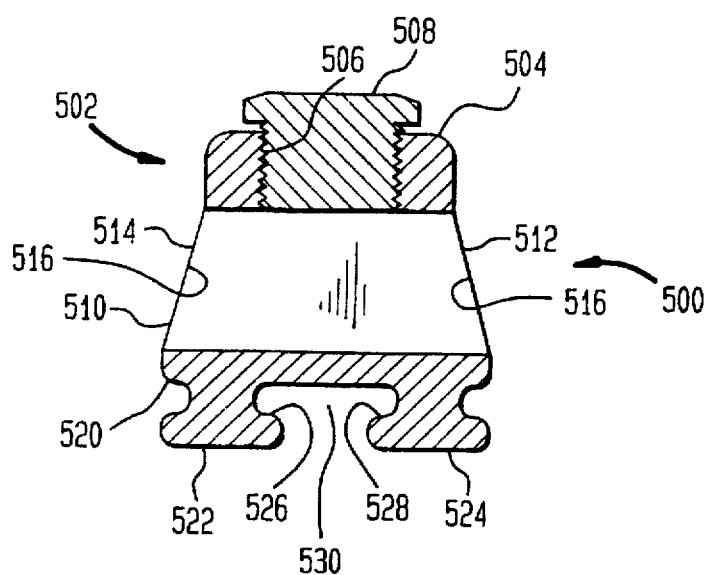
FIG. 25 is a cross-sectional view of a neutral bar taken along line 25—25 in FIG. 20.

Referring to FIG. 20, split neutral bars 500 each of which constitute an electrically conductive common junction for the connection of return wires of distribution circuits to the main power line return are shown mounted in channels 260 of basepan 200. In accordance with an aspect of the present invention, in order to improve the visibility of the electrical connector apertures of the neutral bar into which the return wires of the distribution circuits are to be inserted and secured, and thereby facilitate the connection of the return wires to the neutral bars by the electrical installer, each neutral bar has a central portion having a generally trapezoidal shaped cross-sectional area with outwardly sloping sidewalls. Such configuration permits viewing of the electrical connector apertures positioned in the sidewalls from various positions such as either orthogonally or directly overhead, or from the side. Referring to FIG. 25 which is a cross-sectional view of neutral bar 500 shown in FIG. 20 taken along line 25—25, neutral bar 500 has a central body portion 510 having a generally trapezoidal shaped cross-sectional area with outwardly sloping sidewalls 512 and 514. Electrical return wire connector apertures 516 are provided in the sidewalls 512 and 514 of neutral bar 500. Top portion 502 of neutral bar 500 has a top wall 504 through which a series of tapped holes 506 are provided each of which is in communication with correspondingly positioned return wire connector aperture 516. Positioned within each tapped hole 506 is a threaded clamping screw 508 to secure the return wire to the neutral bar.

Figure 26:
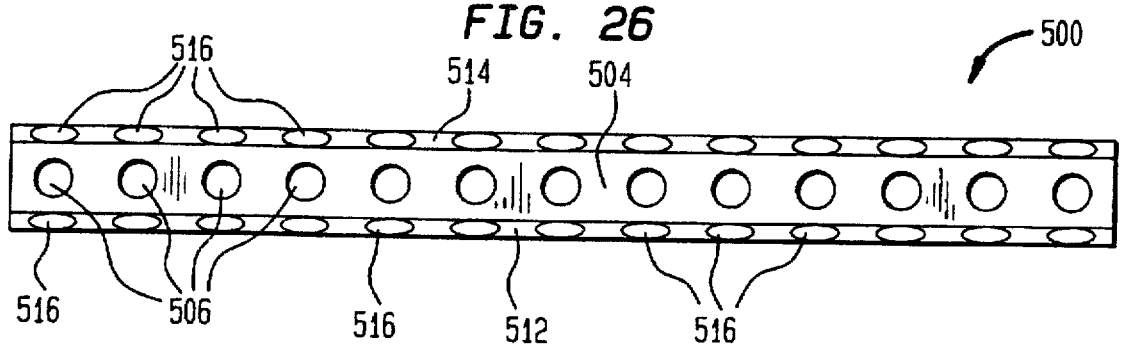
FIG. 26 is a top view of the neutral bar shown in FIG. 20.

The positioning of apertures 516 in the side walls 512 and 514 of the generally trapezoidal shaped cross-sectional area body 510 of neutral bar 500 enables the field installer to readily visually correlate the particular aperture into which a selected corresponding electrical return wire is to be inserted and subsequently secured by a clamping screw 508. Thus, as shown in FIG. 26, when viewing neutral bar 500 orthogonally (i.e. directly overhead) as shown for example, in the top view of neutral bar 500 with screws 508 removed, each of tapped holes 506 in top wall 504 and each of correspondingly positioned electrical connector apertures 516 in side walls 512 and 514 are readily observed and located thereby facilitating proper insertion and connection of the return wires to the neutral bar.

Figure 27:
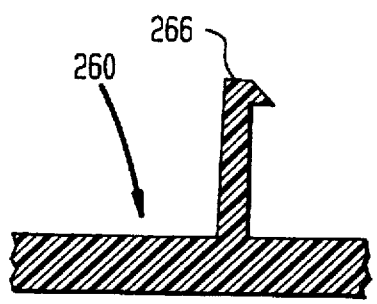
FIG. 27 is a cross-sectional view of upwardly extending flexible snap hook taken along line 27—27 in FIG. 8.

In accordance with an aspect of the present invention, neutral bar 500 is also adapted to permit simplified assembly and mounting to basepan 200 which does not require the use of screws or other separate fastening devices thereby reducing the number of components in the load center. Referring again to FIG. 25, extending from the central portion 510 of neutral bar 500 is a base 520 adapted to have a "T"-shaped slot 530, formed by the space between two mounting rails 522 and 524, which receives securing means integrally formed with and extending upward from channels 260 of basepan 200. Referring to FIGS. 7, 8, and 20, the securing means of basepan 200 comprises upwardly extending alignment blocks 262 which fit within the space between mounting rails 522 and 524 to align neutral bar 500 within channel 260, and upwardly extending flexible snap hooks 264 and 266 (FIG. 27) which snappingly engage ridges 526 and 528, respectively, of mounting rails 522 and 524 (FIG. 25) to lockingly join neutral bar 500 to basepan 200. Neutral bar 500 can thereby be quickly and easily mounted to basepan 200 and is retained in place without the need of any additional fastening devices. Although neutral bar 500 may be fabricated as a unitary cast or molded member, in a preferred embodiment, neutral bar 500 is manufactured from an extruded metal such as aluminum.

Figure 28:
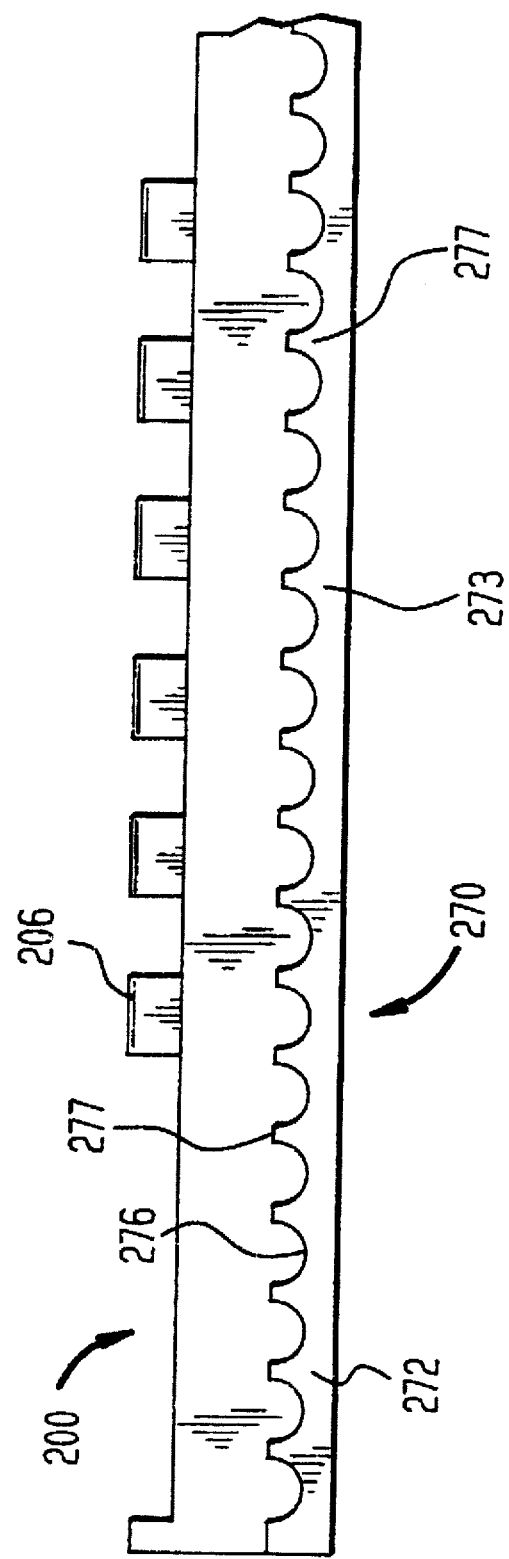
FIG. 28 is a side elevational view of neutral bar wire guide taken along line 28—28 in FIG. 8.

In order to further facilitate the installation of the return wires to the neutral bars of the load center, in accordance with an aspect of the present invention, a neutral bar wire guide is provided which assists the electrician or installer in guiding the return wires of distribution circuits into the electrical connector apertures in the neutral bars. As shown in FIGS. 7, 8, and 20, integrally formed with basepan 200 are two neutral bar wire guides 270 each of which comprises a wall 272 upwardly extending from the surface of the basepan 200 at the edge of the channel 260 and having semicircular slots 276 extending through wall 272 at top surface 275 between an outerface 273 and innerface 274 where each semicircular slot 276 is separated from one another by teeth 277. The structure appears as a scalloped edge (FIG. 28). Each semicircular slot 276 is positioned to receive a neutral return wire and guide the end of the wire through the slot 276 from the outerface 273 past the innerface 274 and into a preselected electrical connector aperture 516 in neutral bar 500 (FIG. 20). Neutral bar 500 is positioned in channel 260 of basepan 200 so that each one of the electrical connector apertures 516 which are to receive a neutral return wire are aligned with a corresponding one of the semicircular slots 276 in neutral bar wire guide 270 as shown in FIG. 20.

The alignment of the semicircular slots 276 in neutral bar wire guide 270 with the electrical connector apertures 516 in neutral bar 500 also assists the electrical installer in locating the electrical connector apertures 516 and reduces the time required to connect the neutral return wires. Teeth 277 of neutral bar wire guide 270 function to assist in maintaining electrical isolation between each neutral wire and ground.

The use of neutral bar 500 having a trapezoidal shaped cross-sectional area with readily viewable electrical connection apertures 516 combined with the neutral bar wire guide 270 having semicircular slots 276 which are aligned with the electrical connection apertures 516 of neutral bar 500, particularly facilitates the connection of the neutral return wires to the neutral bar by the electric installer.

In accordance with an aspect of the present invention, an improved neutral tie bar 550 which mechanically and electrically connects neutral bars 500 together is provided. Referring to FIGS. 20 and 30 (which is a top view of neutral tie bar 550 shown in FIG. 20 with other components removed for clarity of illustration), neutral tie bar 550 is an electrically conducting member to electrically connect the neutral bars 500 and has a center portion 552 and vertically offset laterally extending ends 564 and 566 which are connected by screws 570 through apertures 568 and into corresponding tapped apertures 506 in each of neutral bars 500. Referring to FIG. 29 (which is a sectional view taken along line 29—29 in FIG. 30), neutral tie bar 550 is shown comprising a first elevated member 554 disposed between center portion 552 and each end 564 and 566 which are adapted to form a cable lug 556 for receiving, in a horizontally disposed bore 558, a branch neutral cable which is to be secured therein by threaded clamping screw 562 within vertically extending tapped bore 560. Extending between first elevated member 554 and end portion 566 is a second elevated member 572 which is adapted to have a neutral cable lug 574 for receiving in a horizontally disposed bore 576 the incoming neutral cable which is to be secured therein by threaded clamping screw 580 within tapped bore 578. Neutral tie bar 550 is secured to basepan 200 by heat staking hollow post 238 which extends upward from basepan 200 through aperture 582 (FIGS. 7 and 8).

In some applications in which the neutral bar of the load center is not or has not been connected to an external grounding bar and therefore has not been electrically grounded, there is nonetheless a need to assure that there is no potential difference between the neutral and the ground. In accordance with an aspect of the present invention, in order to eliminate any potential difference between the neutral and ground of the load center, neutral tie bar 550 is adapted to be capable of being electrically connected to the outer metal enclosure 10 of the load center. Since each power company providing service maintains the potential of the neutral at or close to zero volts, the function of connecting the neutral of the load center to the ground is accomplished by electrically connecting the neutral tie bar to the metal outer enclosure. Referring to FIG. 29, neutral tie bar 550 is adapted to have an aperture 586 for accepting a fastener (not shown) which passes through a correspondingly positioned hole in hollow post 248 in basepan 200 (FIG. 8) and into a correspondingly positioned hole 38 in enclosure 10 (shown in FIG. 2). Although neutral tie bar 550 may be fabricated as a unitary or molded member or by casting metal, in a preferred embodiment neutral tie bar 550 is manufactured from extruded aluminum.

A removable barrier is typically provided between the incoming service main lugs, which connect the incoming service or main lines to the load center, and the remainder of the components in the load center. In accordance with an aspect of the present invention, a new and improved main lug insulator 600 is provided to separate the main line lugs from the remainder of the components in the load center. The improved main lug insulator functions to: (a) insulate each of the main lugs from the neutral tie bar and neutral lugs; (b) reduce incidental shorting or inadvertent enerqization of current carrying conductors both during field installation as well as subsequent operation; and (c) maintain required over-surface and through-air spacing for cooling and expansion of the main lugs.

Main lug insulator 600 is an integrally formed member made of an electrically insulative material which can be injection molded or extruded. Referring to FIG. 31 which is an isolated perspective view of the main lug insulator shown in FIG. 20, main lug insulator 600 has two trough-shaped compartments 610A and 610B for the receipt of main lugs 420 and 460, respectively. Each compartment 610A and 610B is comprised of a platform 612 from which extends two upstanding partition walls 614 and 616 having oppositely facing open ends 618 and 620. Open ends 620 provides access for the receipt of bus bar connector 408 and 448 and open ends 618 provide access for the receipt of the ends of power cables (FIG. 31B). Platform 612 of each compartment has a groove 638 extending transversely for the receipt of a rail on the underside of the main lugs 420 and 460 to facilitate the positioning of each lug within each compartment.

Extending downward from the edge of each open end 618 and downward from the edge of each open end 620 are substantially parallel support legs 622 and 624, respectively, which connect the two compartments together laterally and which elevate each compartment vertically (FIGS. 31A, 31C and 31E). Legs 622 and 624 are spaced apart so as to straddle the width of the neutral tie bar 550 and suspend compartments 610A and 610B transversely over the neutral tie bar when installed in the basepan 200. Leg 622 has a mounting bracket 628 which extends transversely therefrom and is heat staked to secure main lug insulator 600 to post 280 in basepan 200. Leg 624 has a face 625 which extends laterally between the two compartments 610A and 610B.

Extending from the underside of platform 612 of each compartment are bars 636 which are positioned so that when main lug insulator 600 is installed in the load center, bars 636 engage correspondingly positioned and shaped slots 584 in neutral tie bar 550. This functions to maintain the position and alignment of the neutral tie bar together with the main lug insulator for mounting by heat staking. Also extending from the underside of platform 612 and outer face 630 of upstanding walls 616 of each of the compartments is an alignment member 632 which forms a slot 634 with leg 624. When main lug insulator 600 is installed within basepan 200, slot 634 engages edges 284, 286, and 288 of upstanding barrier member 282 of basepan 200 (FIG. 7) which completes the barrier between (a) the main lugs and bus bar connectors and (b) the neutral lugs and neutral tie bar as shown in FIG. 20.

While the foregoing description and drawings represent the preferred embodiments of the present invention, it will be apparent to those skilled in the art that various changes and modifications may be made therein without departing from the true spirit and scope of the present invention.

What is claimed is:

1. A basepan for mounting selected components in an electric load center, the basepan comprising:

a basepan surface to which a selected component of the load center is to be mounted, the surface having at least one integrally formed post for peening over by heat staking to secure the selected component to the basepan, wherein the integrally formed post has a torroidal shaped undercut, the torroidal shaped undercut is mutually formed by the post and the basepan at their intersection.

2. The basepan as in claim 1 wherein the integrally formed post is a solid post.

3. The basepan as in claim 1 wherein the integrally formed post is a hollow post.

4. The basepan as in claim 2 wherein the undercut is torroidal shaped.

5. The basepan as in claim 3 wherein the undercut is torroidal shaped.

6. The basepan as in claim 1 wherein the undercut in the basepan is integrally formed within the basepan.

7. A basepan for an electrical load center comprising a surface upon which bus bars are mounted, means for mounting and supporting circuit breakers thereon, a plurality of integrally formed posts extended from a surface of the basepan securing the bus bars thereto by heat staking, at least one of the plurality of integrally formed posts having a torroidal shaped undercut, the torroidal shaped undercut is mutually formed by the post and the basepan at their intersection whereby sharp corners at the intersection are avoided.

8. The basepan of claim 7 wherein the posts comprise integrally formed solid posts.

9. The basepan of claim 7 wherein the posts are integrally formed hollow posts.

* * * * *